United States Patent
Suroshi et al.

(10) Patent No.: US 10,062,300 B2
(45) Date of Patent: Aug. 28, 2018

(54) MODULAR LEARNING DEVICE

(71) Applicants: Yogesh Rao Suroshi, Madhya Pradesh (IN); Purnima Yogesh Suroshi, Madhya Pradesh (IN)

(72) Inventors: Yogesh Rao Suroshi, Madhya Pradesh (IN); Purnima Yogesh Suroshi, Madhya Pradesh (IN)

( * ) Notice: Subject to any disclaimer, the term of this patent is extended or adjusted under 35 U.S.C. 154(b) by 233 days.

(21) Appl. No.: 14/983,542

(22) Filed: Dec. 30, 2015

(65) Prior Publication Data

US 2017/0116876 A1    Apr. 27, 2017

(30) Foreign Application Priority Data

Oct. 24, 2015   (IN) .......................... 4019/MUM/2015

(51) Int. Cl.
*G09B 19/00*   (2006.01)
*G09B 19/08*   (2006.01)
*G09B 3/10*    (2006.01)
*G09B 19/22*   (2006.01)

(52) U.S. Cl.
CPC .............. *G09B 19/08* (2013.01); *G09B 3/10* (2013.01); *G09B 19/22* (2013.01)

(58) Field of Classification Search
None
See application file for complete search history.

(56) References Cited

U.S. PATENT DOCUMENTS

| | | | | |
|---|---|---|---|---|
| 3,601,403 A * | 8/1971 | Weisbecker | ........ | A63F 3/00574 273/153 S |
| 3,665,618 A * | 5/1972 | Hahn | ................... | G09B 17/006 273/237 |
| 3,947,036 A * | 3/1976 | Kupec | ................... | A63F 3/0423 273/272 |
| 4,015,351 A * | 4/1977 | Sasson | ..................... | G09D 3/00 40/110 |
| 5,087,052 A * | 2/1992 | Simon | ....................... | A63F 3/00 273/272 |
| 7,000,920 B2 * | 2/2006 | Camp | ....................... | A63F 9/18 273/270 |

* cited by examiner

*Primary Examiner* — Sunit Pandya

(57) ABSTRACT

A modular learning device comprising of a base board having a frame with plurality of sides, a network of tracks having a spinal track and several other tracks; a plurality of sliding blocks; and a plurality of wisdom cards having an identifier section, a margin having same number of sides as the base board, a plurality of zones in the margin, and a middle area, a solution code for the problems or situations, each wisdom card containing different problems or situations, and an indicator for each problem or situation, for generating the solution code. The wisdom card may be on academic, linguistic, cultural and behavioral subjects, including situations for persons with physical or mental constraints. A plurality of base boards can be unified by a complementary construction to use combination wisdom cards for cross learning of two or more subjects and for learning several languages together.

41 Claims, 33 Drawing Sheets

| sanskrit to english number. | | | |
|---|---|---|---|
| पञ्च | = 5 + 5 | 6 + 4 = | EIGHT |
| पट् | = 4 + 5 | 7 + 2 = | FIVE |
| त्रय: | = 3 + 5 | 4 + 4 = | THREE |
| द्वे | = 2 + 5 | 4 + 3 = | ONE |
| चत्वार: | = 1 + 5 | 3 + 3 = | TWO |
| सप्त | = 0 + 1 | 1 + 0 = | SEVEN |
| दश | = 1 + 1 | 2 + 0 = | SIX |
| एक: | = 1 + 2 | 0 + 3 = | FOUR |
| अष्ट | = 2 + 2 | 3 + 1 = | NINE |
| नव | = 3 + 2 | 4 + 1 = | TEN |

FIGURE-12A

MODULAR LEARNING DEVICE

FIELD OF THE INVENTION

The present invention relates to knowledge and intellectual enhancement. Particularly, it relates to a learning aid and more particularly to a learning device which facilitates development of youngsters and persons with general as well as specific needs.

BACKGROUND OF THE INVENTION

Physical devices and games are well accepted to be effective for youngsters' mental and intellectual development.

Pairing, question & answer, combination games et cetera are well known. Such games have utility for youngsters as well as elders. The question and answer could be in the form of separate question card and answer card, as disclosed in U.S. Pat. No. 4,657,248 and U.S. Pat. No. 3,172,214.

Use of a Board is known to create question and answer, pairing, combinations, et cetera. U.S. Pat. No. 7,857,313 discloses one such board game for pairing. U.S. Pat. No. 7,000,920 discloses a board game using question and answer cards.

Many a time, key of the answers is required, when the answer is not obvious from the game or when the answer is required to be kept non obvious to the person engaged. One of the ways to meet this aspect is by electrical connection as disclosed by U.S. Pat. No. 3,070,904 and U.S. Pat. No. 3,122,843. Also, games are available where answers are available in the form of respective colours.

Board games having tracks to move slide blocks are known, two such disclosures being patent No. CN201812390 and patent No. CN201775943.

Known board games have limitations on subject versatility, options of logic building and maneuverability, which present invention addresses to a large extent.

OBJECTIVE OF THE INVENTION

Accordingly, it is an objective to invent a learning device which imparts educational enhancement.

Another objective is to invent a learning device which imparts intellectual enhancement.

Another objective is to invent a learning device which can cater to learning in large number of subjects.

Another objective is to invent a modular learning device which connects questions and answers in multiple manners.

Yet another objective is to invent a modular learning device which can be expanded to enhance the learning possibilities.

Yet another objective is to invent a learning device which has solution or answers to the questions latently available.

SUMMARY OF INVENTION

The invention is a modular learning device having a base board, a plurality of sliding blocks and a wisdom card. The base board is in the shape of a frame, particularly an open frame having three sides, as one embodiment, and has two major planes, interconnected slots, termed as a network of tracks. The sliding block has a distinct identification. The distinct identification helps in generating a solution code for problems or situations. The wisdom card has an identifier section, margins which are like columns, and a middle area, the margins divided into a plurality of zones. When the wisdom card is mounted in the base board, there is at least one solution track of the base board opposite each zone in the margins of the base board. The wisdom card has a plurality of questions or situations, depicted in the middle area. Each question has an answer or a solution, which is shown in any of the zones randomly. The identifier section of the wisdom card contains subject of the wisdom card. The identifier section also contains some educative or inspirational sentence or verse in a language which is understood by the person using the modular learning device. Importantly, the identifier section also contains a solution code for problems. In the preferred embodiment, the solution code is in the form of colour. An indicator is provided with each question, near corresponding zone. In the preferred embodiment, the indicator is a marker of a distinct colour.

The modular learning device, when ready to be deployed, has sliding blocks with top surface of different colours, the sliding blocks mounted on the base board and positioned in the dormant tracks. A selected wisdom card is inserted in the enclosed recess of the base board.

There are limitless subjects for coining problems and solutions using the wisdom card of present invention. A wide range of subjects—academic, cultural and behavioural, learnable using wisdom card can be deployed in this modular learning device.

One of the unique wisdom cards is usable for persons with hearing and talking inability, due to which such persons need to learn fingerspelling. Such a wisdom card has words shown with fingerspelling and the learner matches English spelling.

Yet another unique wisdom card is usable for cross learning different languages together with simple arithmetic. The problem in such a wisdom card is in the arithmetic form and some of the solutions are in one language while some are in some other language. This embodiment of the wisdom card discloses the inventive cross learning technique of two or more subjects.

Another inventive deployment of wisdom card contains certain animals in the middle area. In the margins, the names of the animals are given in two different languages, English and Hindi, at random location. The learner is required to relate an animal with the name of the animal. By deployment of multiple wisdom cards as per present invention simultaneously, one can learn several languages, where images of same animals are given in the same order in all the wisdom cards while their names are given in different languages in different margins. Such a group of wisdom cards where identical problems are given in the middle area in the same order, while the answers or solutions are in different form or language are termed as combination wisdom cards.

The learner can mount different wisdom cards in different base boards. Alternatively, different base boards can be unified. To be able to unify, the base board has a complementary joining construction on the sides of the base board.

The solution code is provided in the identifier section of the wisdom card or on a rear side. As an alternative, the solution code is provided as the respective solution colour, in the zones adjacent to the respective question or situation. As yet another alternative, the solution code is provided away from the wisdom card. On the rear side of the wisdom card, educative and or informative contents are provided.

As a preferred embodiment, the solution code is a set of colour bars which are bars of same colour as is prompted by the questions by way of an indicator near the question, and in the same order as they come on the head of the sliding block when all the questions are answered correctly. As another embodiment, the indicator, which is a marker of distinct colour, is provided with answer in the plurality of zones.

As another embodiment, the distinct identification of the head of the sliding block is a geometric shape. As another embodiment, the distinct identification of the head of the sliding block is an alphabet. In such an embodiment the indicator is an alphabet and the solution code is a set of alphabets.

As another embodiment, a plurality of rolling alphabet or rolling numeric or a combination thereof is provided, by way of a plurality of flexible strips containing several alphabets or numeric, embedded in the head of the sliding block.

As another embodiment, the base board is a plurality of open frames such that more than one wisdom card is inserted at a time, and where either more than one player can play or a single player can play on multiple wisdom cards. As another embodiment, where there is more than one wisdom card insertable, some of the tracks can function as parking track as well as solution tracks.

As another embodiment of the base board, the base board has a continuous parking track and a plurality of alternately reverse ending tracks usable as solution tracks. Correspondingly, by creating more zones on the wisdom card, more number of questions is incorporable in the middle area of the wisdom card.

As another embodiment, the base board is a close frame with five sides. Correspondingly, the modular learning device with the wisdom card is mounted on an open recess.

There are several ways in which the intelligent device as disclosed in present invention can be constructed. The network of tracks disclosed here is a continuous track, however the network of tracks can be discrete and comprising of several holes or holding places or locating places. The sliding block is described as mounted in the disclosure but the sliding block can be in the form of a solution coin, merely placed instead of sliding or moving. The sliding block as described or in the form of the solution coin can have a magnet in order to attach to the base board.

BRIEF DESCRIPTION OF DRAWINGS

FIG. 1 shows a modular learning device having a wisdom card and sliding blocks, while

FIG. 2 shows a base board with an open frame and a network of tracks, while

FIG. 12A shows another wisdom card for cross learning in multiple subjects, while

FIG. 16A shows an embodiment of a base board having a complementary joining construction on sides of the base board, while

DETAILED DESCRIPTION OF INVENTION

The preferred embodiment as per our invention will now be described in detail, with reference to the accompanying drawings. The terms and expressions which have been used here are merely for description but the invention can be worked with several variations and the terms and expressions should not be construed to be limiting the invention in any way.

Figure 1:
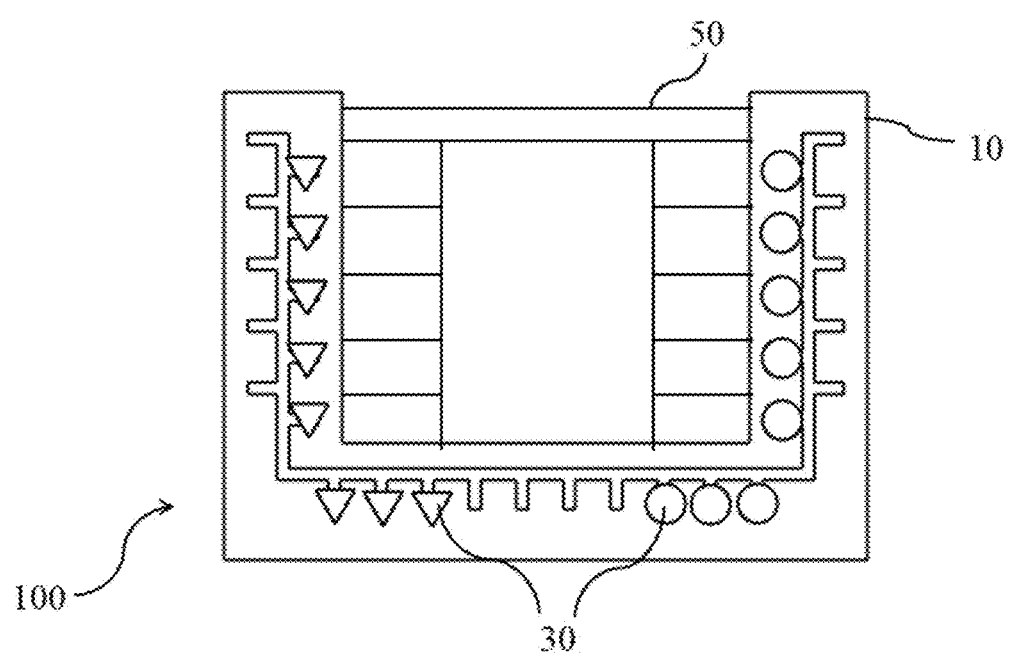

The invention is a modular learning device (100). The modular learning device (100) has a base board (10), a plurality of sliding blocks (30) and a wisdom card (50) as shown in FIG. 1.

Figure 2:
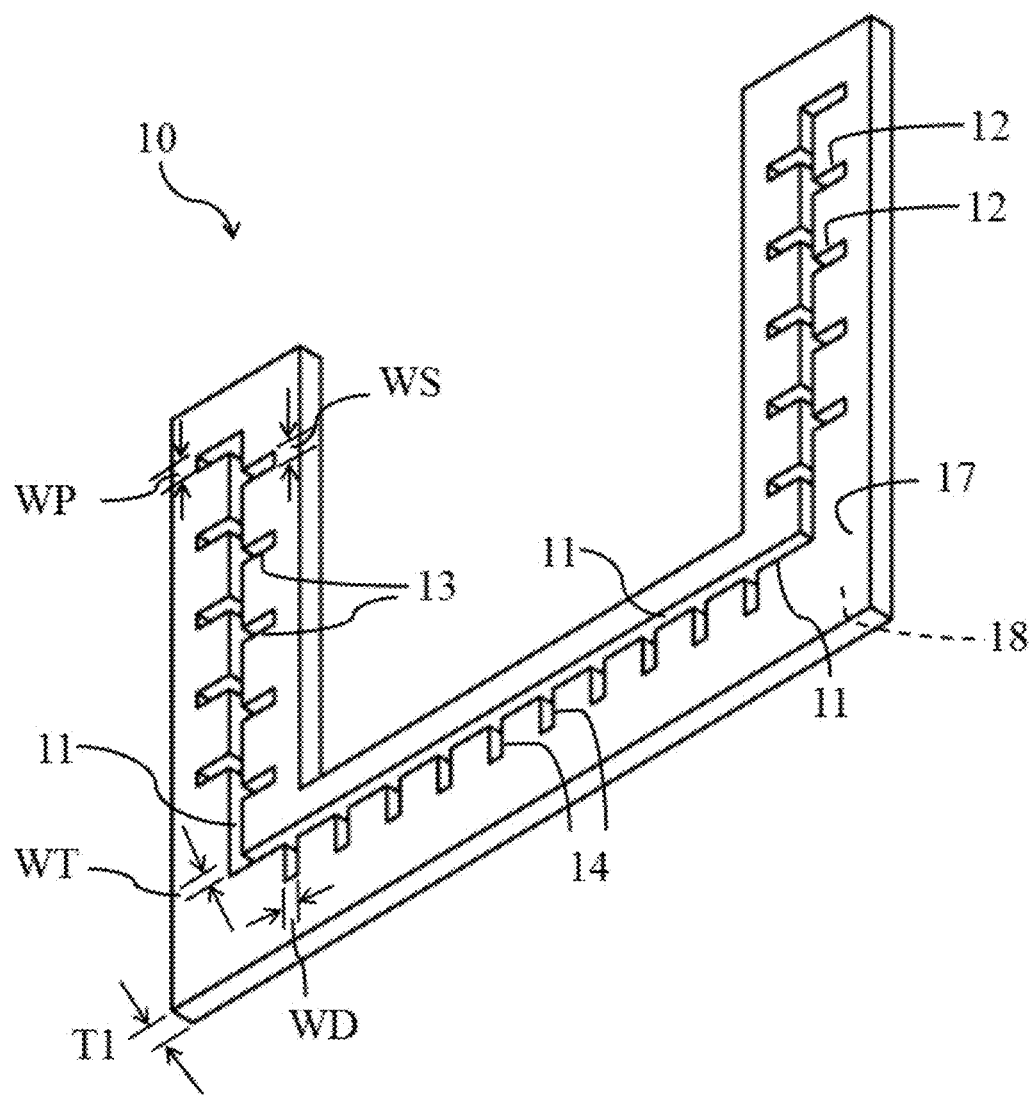
Figure 2A:
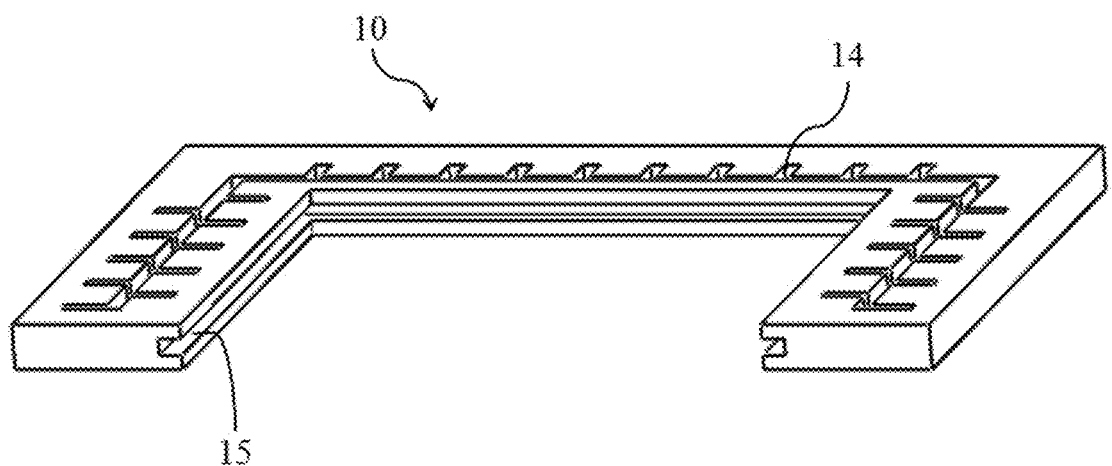
FIG. 2A shows an enclosed recess of the base board.

As shown in FIG. 2 and FIG. 2A, the base board (10) is in the shape of a frame, particularly an open frame having three sides, as one embodiment. The base board (10) has two major planes—a front plane (17) and a rear plane (18). The base board (10) has interconnected slots, termed as a network of tracks. The network of tracks has a spinal track (11), to which several solution tracks (13) are connected. Also connected to the spinal track (11) are several parking tracks (12) and several dormant tracks (14). The dormant track (14) is a track where sliding blocks are kept at the beginning of the use of the modular learning device (100). The parking track (12) is a track where a sliding block (30) is temporarily brought in, in order that another sliding block (30) can move unhindered. Number of dormant tracks (14) is at least equal to number of solution tracks (13). On the base board (10) is an enclosed recess (15) in which any of the plurality of wisdom cards (50) can be mounted by slidably inserting and slidably removing.

Figure 3:
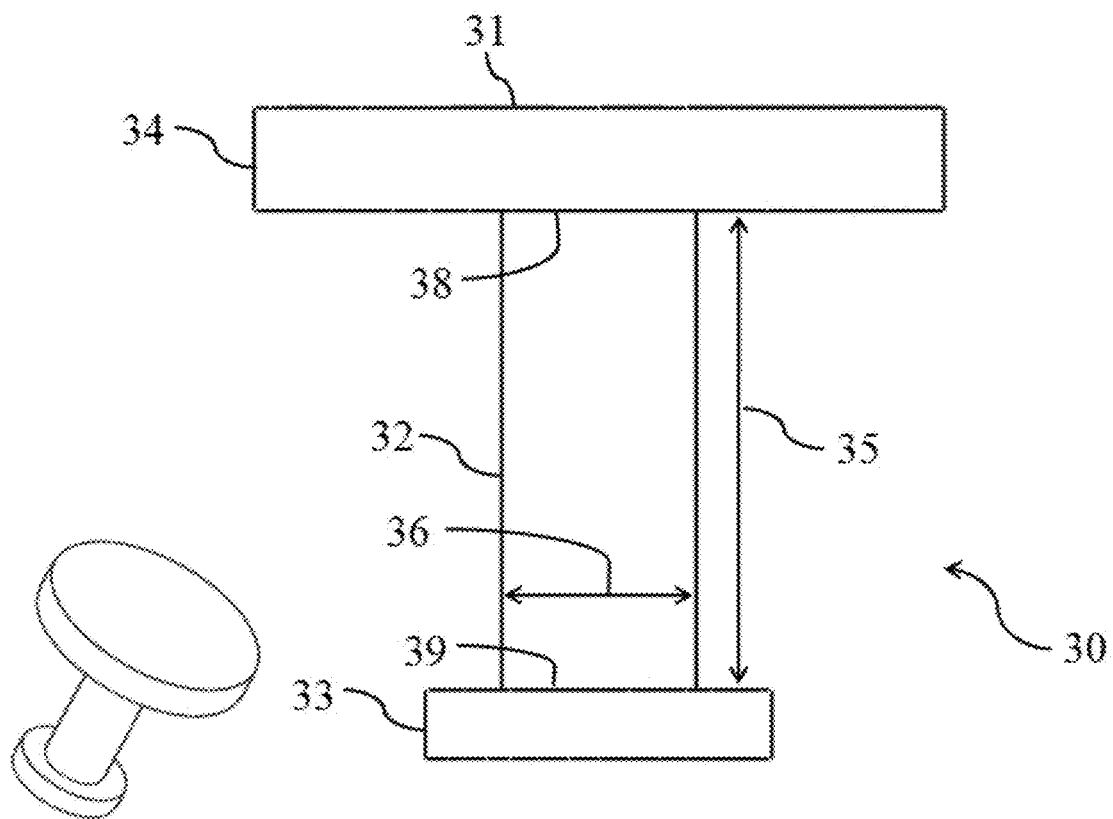
FIG. 3 shows a front view of a sliding block and a perspective view alongside.

As shown in FIG. 3, a sliding block (30) has a head (34), a stopper (33) and a shaft (32). The shaft (32) has a first end (38) and a second end (39). The head (34) is a rigid platform. The top surface (31) of the head (34) has a distinct identification. The distinct identification helps in generating a solution code for problems or situations as shall be described later below.

As a preferred embodiment, the distinct identification is a distinct colour.

Referring to FIG. 2 and FIG. 3, a width (WT) of the spinal track (11), a width (WP) of the parking track (12), a width (WS) of the solution track (13) and a width (WD) of the dormant track (14) is same and slightly more than a diameter (36) of the shaft (32) of the sliding block (30). A length (35) of the shaft (32) is marginally more than a thickness (T1) of the base board (10).

Figure 4:
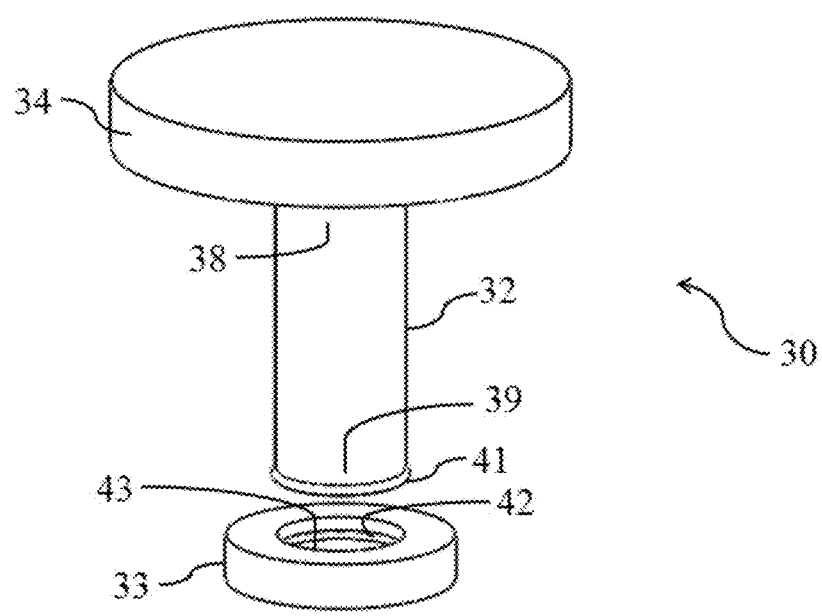
FIG. 4 shows an embodiment of the sliding block with separable stopper.

As shown in FIG. 4, in a preferred embodiment of the sliding block (30), the first end (38) of the shaft (32) is non separably connected with the head (34). The second end (39) of the shaft (32) is separably connected with the stopper (33). To achieve separable connection between the stopper (33) and the second end (39) of the shaft (32), the second end (39) of the shaft (32) has a projection (41) while the stopper (33) has a blind hole (43) and an internal groove (42) therein. The integral groove (42) of the stopper (33) accommodates the projection (41) in the internal groove (42) on pushing in the second end (39) of the shaft (32) in the blind hole (43) of the stopper (33).

Figure 5:
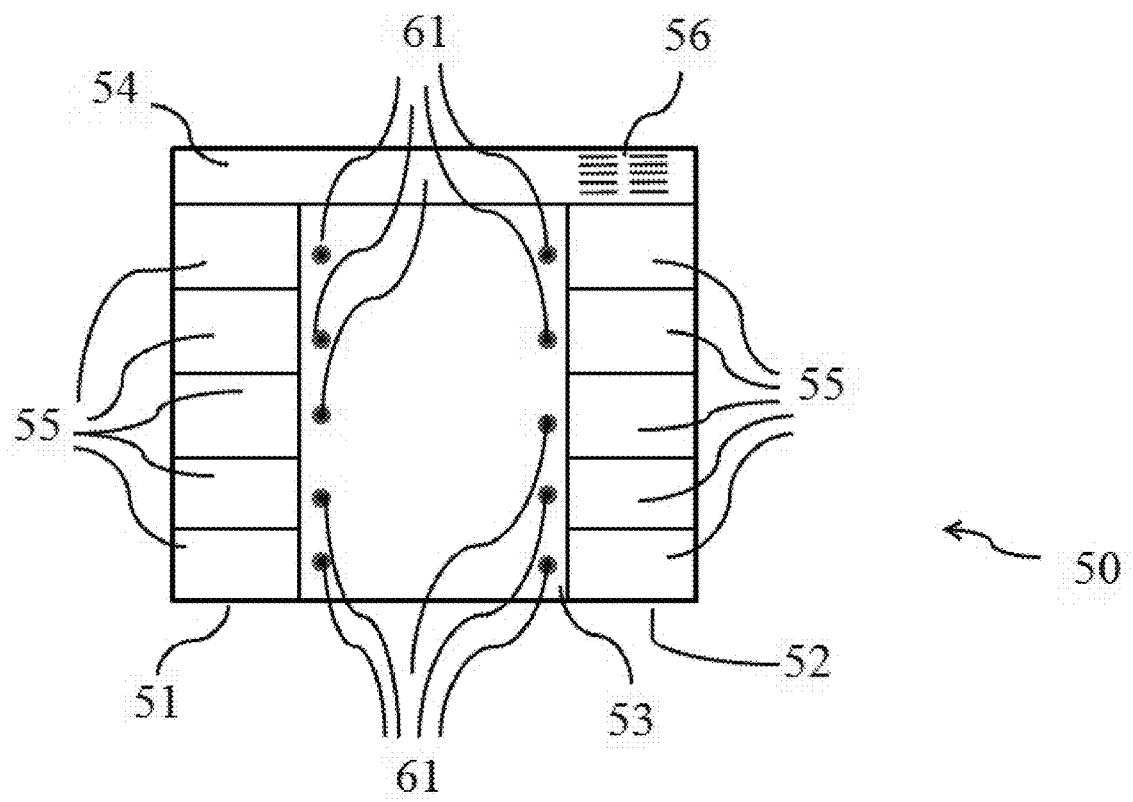
FIG. 5 shows layout details of an embodiment of a wisdom card.

As shown in FIG. 5, a preferred layout of the wisdom card (50) has an identifier section (54), margins (51, 52) which are like columns, and a middle area (53). The margins (51, 52) are divided into a plurality of zones (55).

Figure 7:
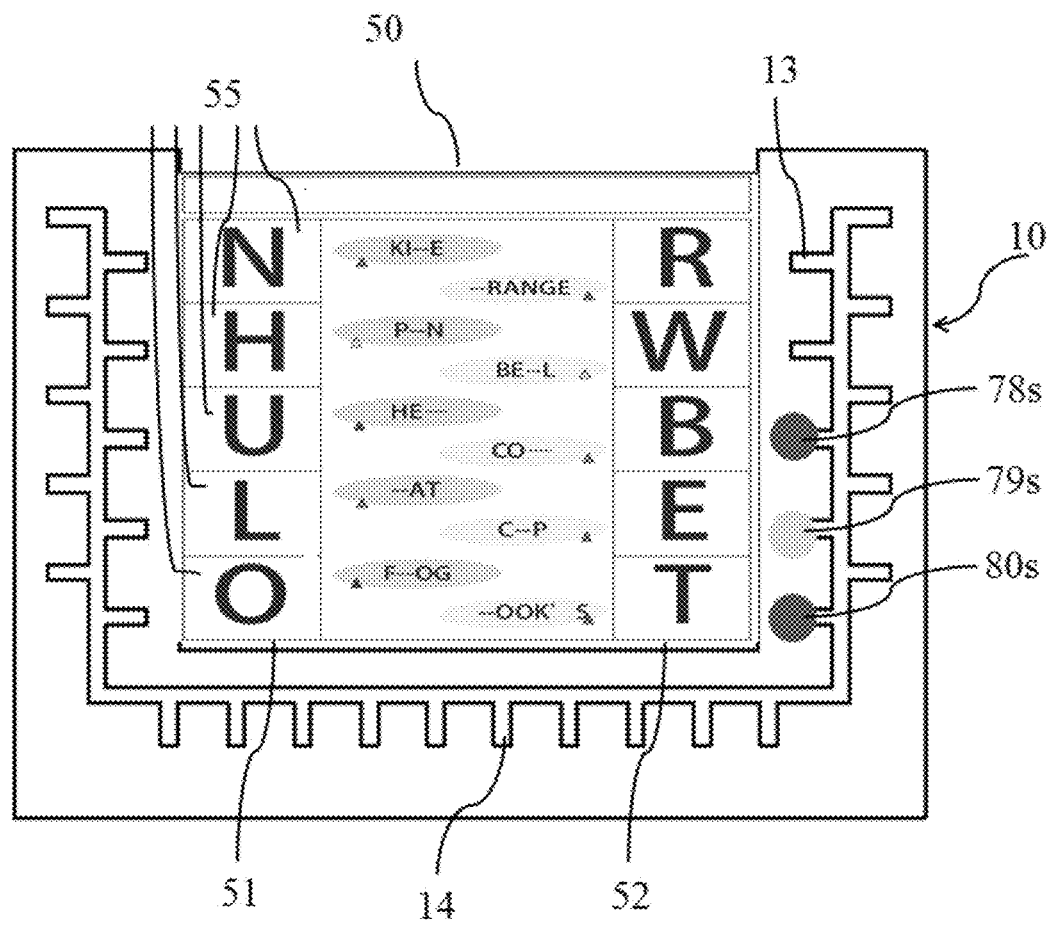
FIG. 7 shows an illustration of a modular learning device with few sliding blocks in solution tracks.

As seen in FIG. 7, when the wisdom card (50) is mounted in the base board (10), there is at least one solution track (13) of the base board (10) opposite each zone (55) in the margins (51, 52) of the base board (10).

Figure 6:
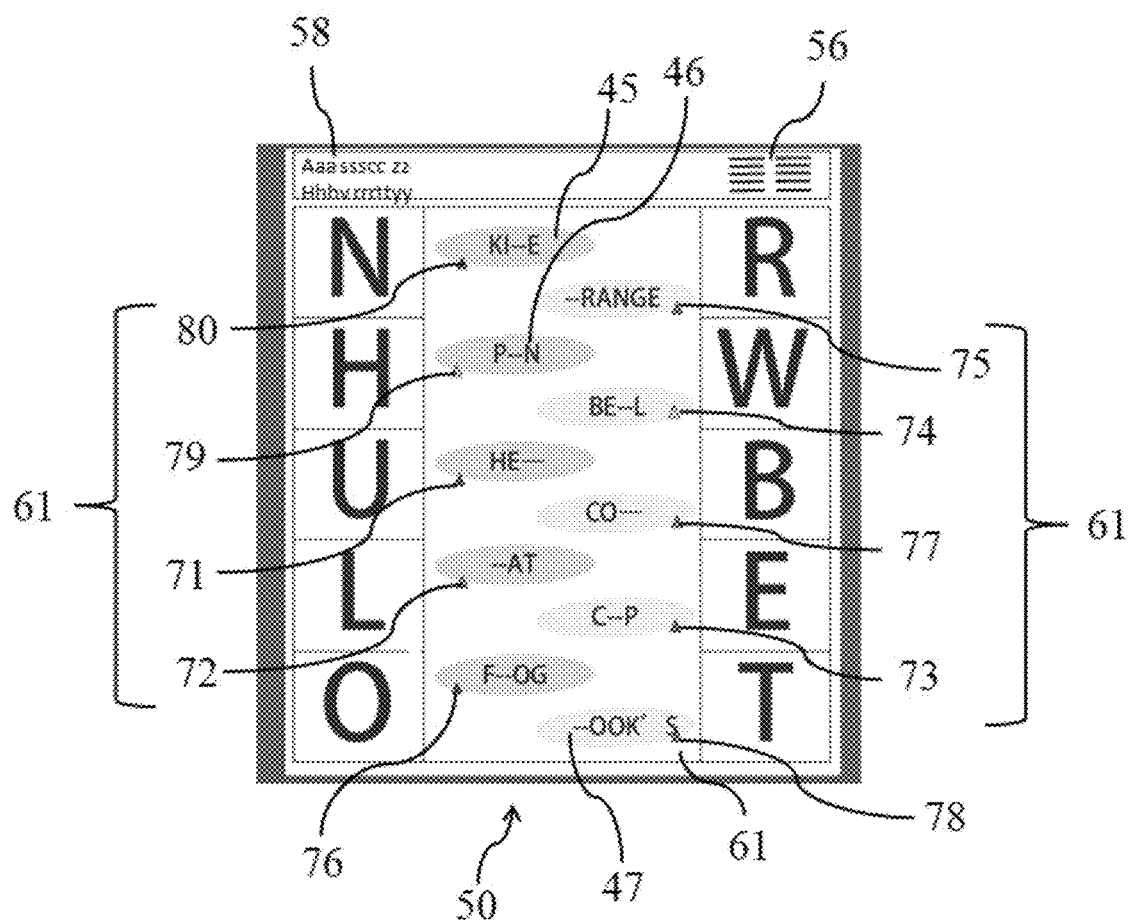
FIG. 6 shows an illustrative wisdom card with indicators placed near the zones.
Figure 11:
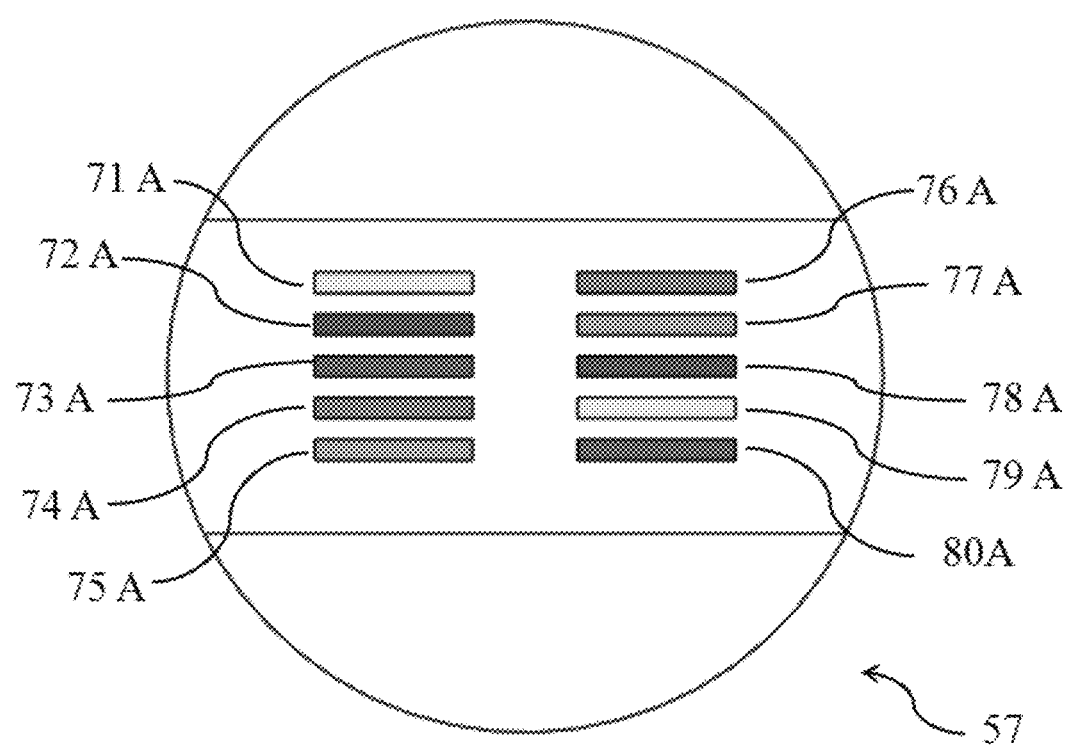
FIG. 11 shows a solution set which is a set of colour bars.
Figure 12:
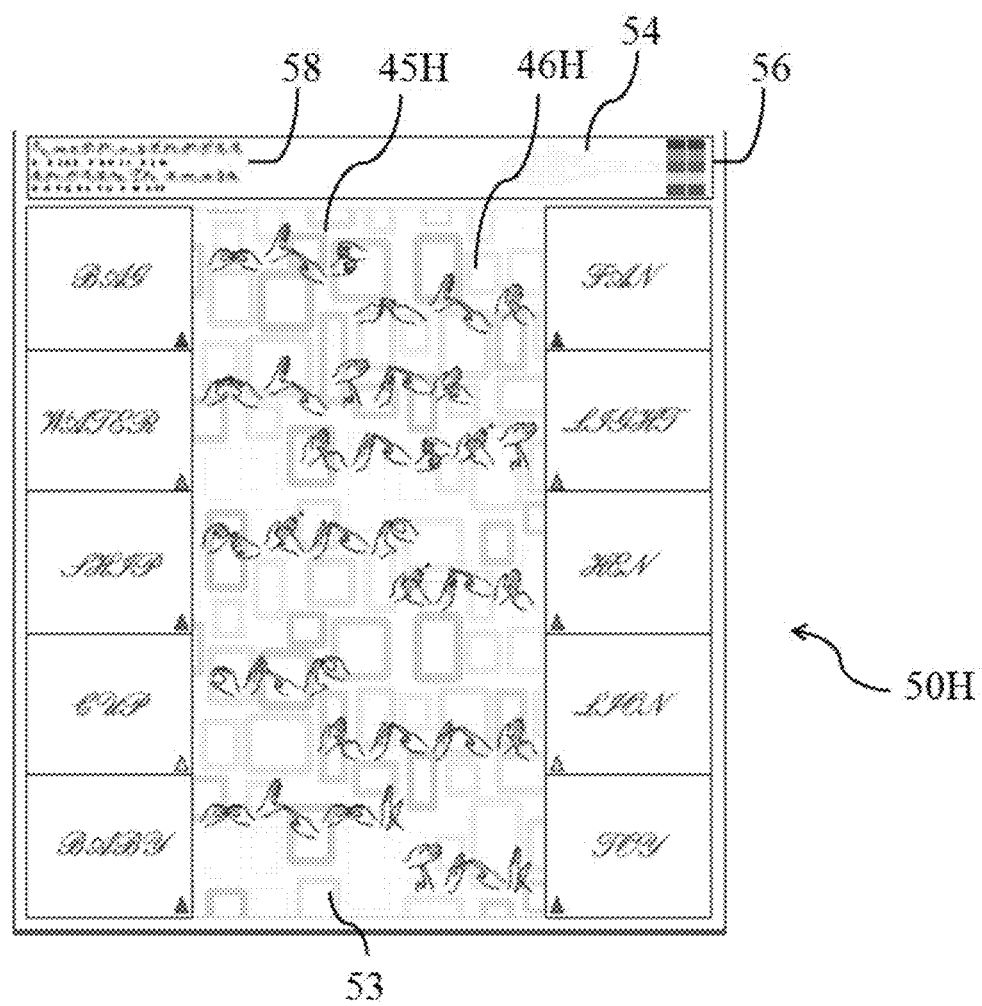
FIG. 12 shows a wisdom card for learning by fingerspelling.

As seen in FIG. 6 and or in FIG. 12, read with FIG. 5, the wisdom card (50) has a plurality of questions or situations, depicted in the middle area (53). Each question has an answer or a solution, which is shown in any of the zones (55) randomly. The identifier section (54) of the wisdom card (50) contains subject of the wisdom card (50). The identifier section (54) also contains some educative or inspirational sentence or verse (58) in a language which is understood by the person using the modular learning device (100). Illustratively, the inspirational sentence could be a line from a holy book, or a popular saying—"Prevention is better than cure". Importantly, the identifier section (54) also contains a solution code (56) for problems. In the preferred embodiment, the solution code (56) is in the form of colour bars (57), shown in FIG. 11. An indicator (61) is provided with each question, near corresponding zone. In the preferred embodiment, the indicator is a marker of a distinct colour.

Figure 3A:
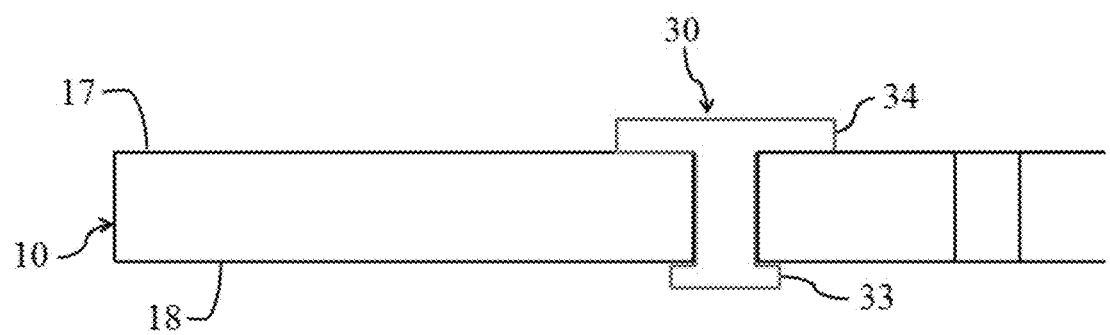
FIG. 3A shows a sectional view showing a sliding block mounted on a base board.

As can be seen in FIG. 3A, the sliding block (30) is mounted on the base board (10) such that the head (34) is on a front plane (17) while the stopper (33) is on a rear plane (18). The sliding block (30) can move freely in the network of tracks and cannot get dislodged unless the stopper (33) is separated using a minimum force.

Figure 1A:
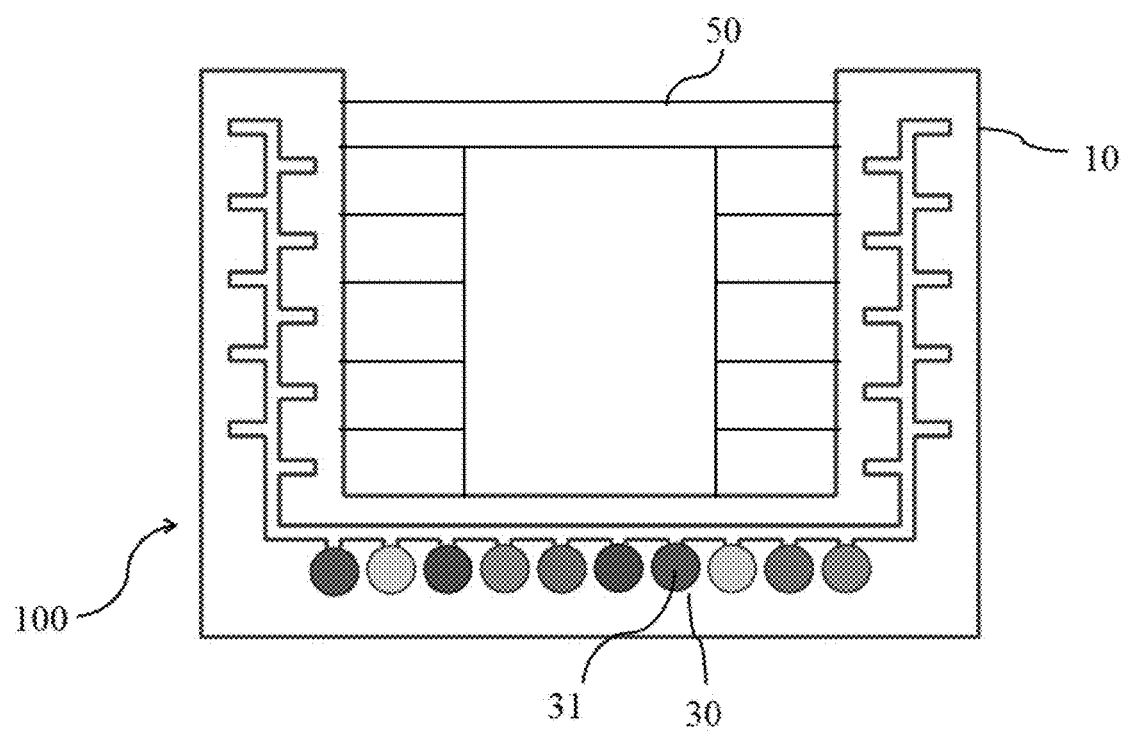
FIG. 1A shows the modular learning device ready to start a learning session.

As shown in FIG. 1A and FIG. 2A, the modular learning device (100), when ready to be deployed, has sliding blocks (30) with top surface (31) of different colours, the sliding blocks (30) mounted on the base board (10) and positioned in the dormant tracks (14). A selected wisdom card (50) is inserted in the enclosed recess (15) of the base board (10).

For an illustration, refer to FIG. 6 and FIG. 7, where the wisdom card (50) contains certain incomplete English language words with one alphabet missing and replaced with a "_" sign. The word KITE is shown as incomplete English word "KI_E" (45). An indicator (61) in the form of a red coloured triangle (80) is provided nearby the incomplete English language word "KI_E" (45). To provide an answer, the person is required to move a red coloured sliding block (80S) from the dormant track to the solution track which is leading to letter "T". Likewise, the word PEN is shown as "P_N" (46) with a yellow coloured triangle (79) near it. To provide an answer, the player is required to move a yellow coloured sliding block (79S) from the dormant track to the solution track which is leading to letter "E". Further, the word BOOK is shown as "_OOK" (47) with a blue coloured triangle (78) nearby. The person thus moves a blue coloured sliding block (78S) from dormant track (14) to solution track (13) leading to letter "B". In this manner, sliding blocks (30) of colour prompted by the indicator (61) provided nearby the question are moved from the dormant tracks (14) to the solution track (13) leading to the solution.

Figure 8:
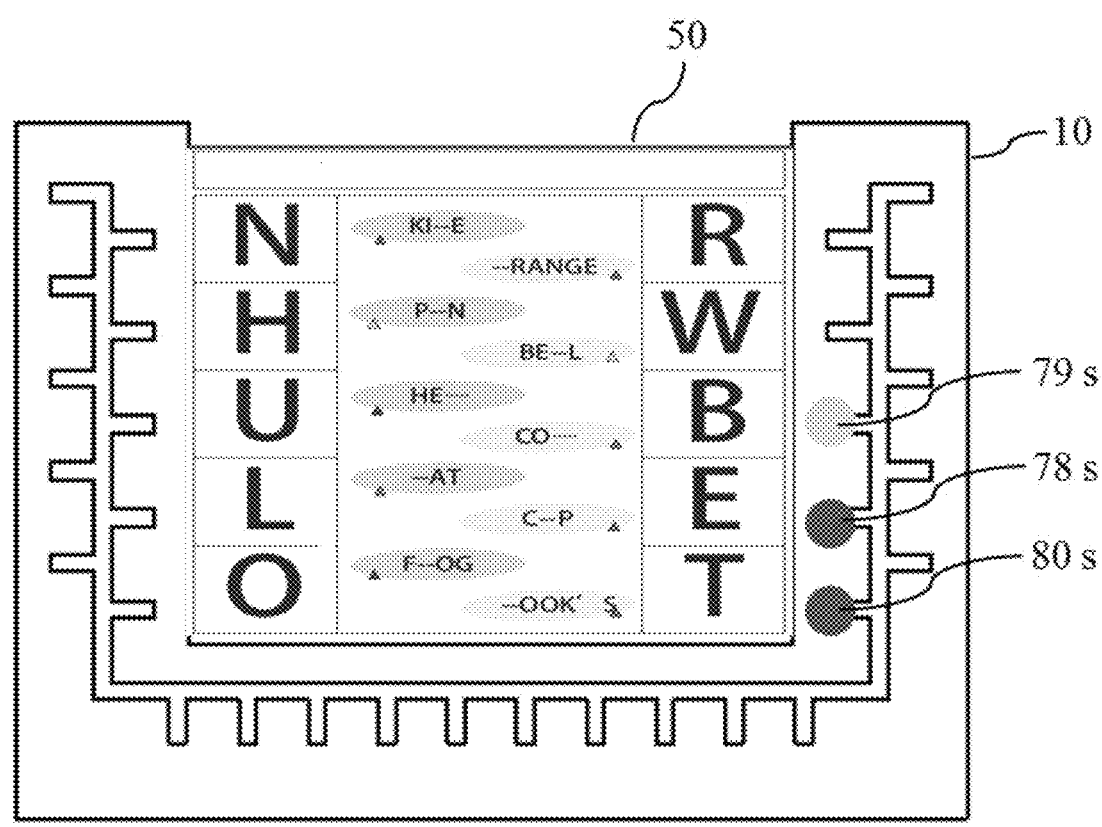
FIG. 8 shows a scenario where a sliding block is wrongly placed.
Figure 9:
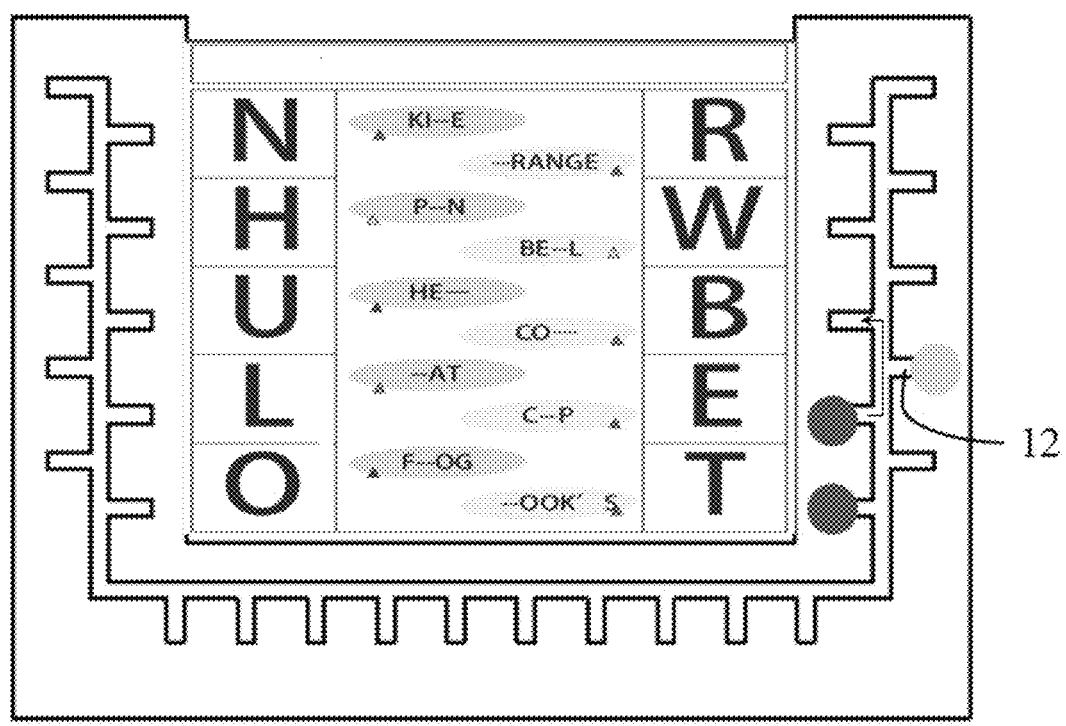
FIG. 9 illustrates a sliding block in parking track.

Shown in FIG. 8 and FIG. 9, in case the player mistakenly puts yellow coloured sliding block (79S) near the letter "B" and blue coloured sliding block (78S) near the letter "E" and needs to interchange the position of blue coloured sliding block (78S) and the yellow coloured sliding block (79S), then the player can temporarily move the yellow coloured sliding block (79S) in a parking track (12), shift the blue coloured sliding block (78S) from in front of letter "E" to in front of letter "B" and then move the parked yellow coloured sliding block (79S) to letter "E".

There are limitless subjects for coining problems and solutions using the wisdom card (50) of present invention. A wide range of subjects—academic, cultural and behavioural, learnable using wisdom card can be deployed in this modular learning device (100). As example—wisdom card can be used to learn arithmetic steps, moods and behaviours of people, names of dance postures, et cetera.

FIG. 12 shows another unique wisdom card (50H), usable for persons with hearing and talking inability, due to which such persons need to learn fingerspelling. The wisdom card (50H) has words (45H, 46H . . . ) shown with fingerspelling and the learner matches English spelling, in the manner described for earlier illustrative wisdom card.

FIG. 12A shows yet another unique wisdom card (50L), usable for cross learning different languages together with simple arithmetic. The problem in this wisdom card is in the arithmetic form and some of the solutions are in English language while some are in Sanskrit language (59). This embodiment of the wisdom card illustrates the inventive cross learning technique of two or more subjects.

Figure 12B:
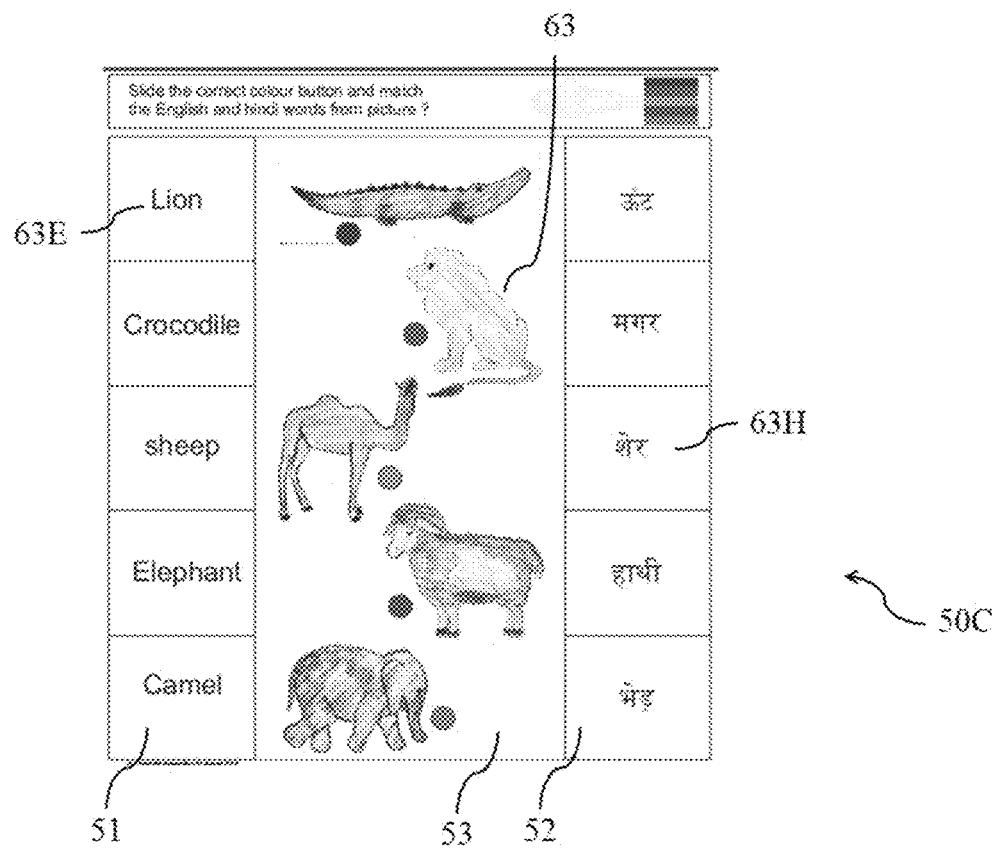
FIGS. 12B to 12E show combination wisdom cards for learning several languages at one go.

FIG. 12B shows further inventive deployment of wisdom card (50C) wherein certain animals are shown in the middle area (53). In the margins (51 and 52), the names of the animals are given in two different languages, English and Hindi, at random location. The learner is required to relate an animal with the name of the animal. For example, the second figure is of a lion (63). While the word "Lion" (63E) is written at first zone from top on the left side margin, the corresponding Hindi word "शेर" (63H) is written at third zone from the top on the right side margin. Hence the learner is required to put a sliding block with red identification at corresponding zones.

Figure 12C:
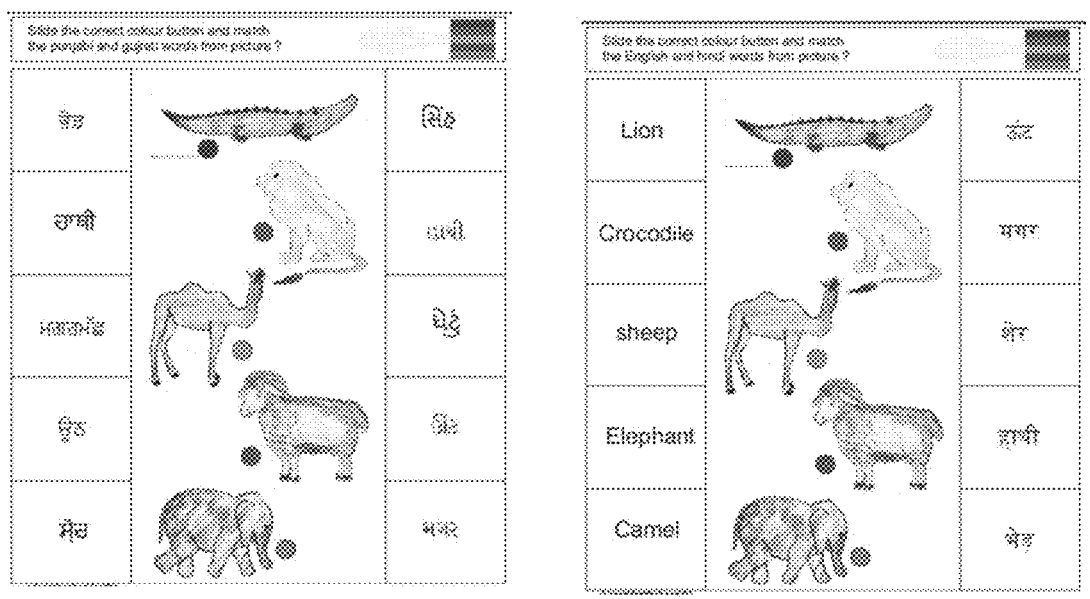
Figure 12D:
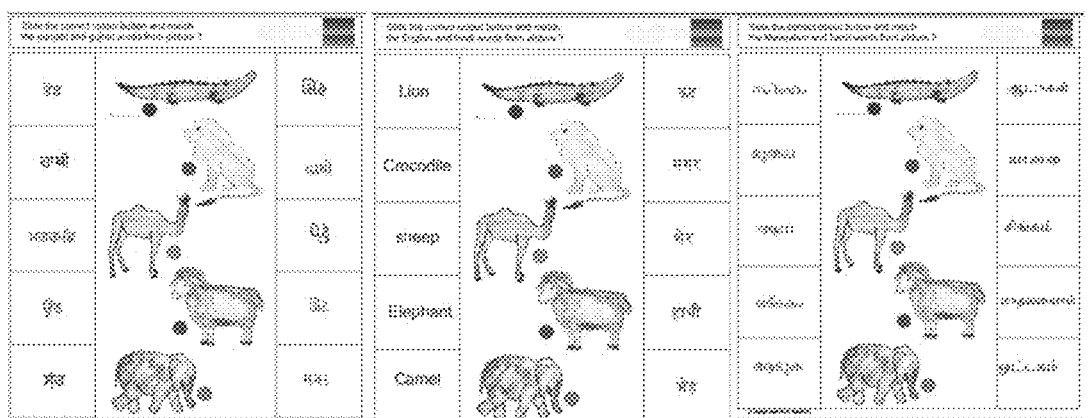
Figure 12E:
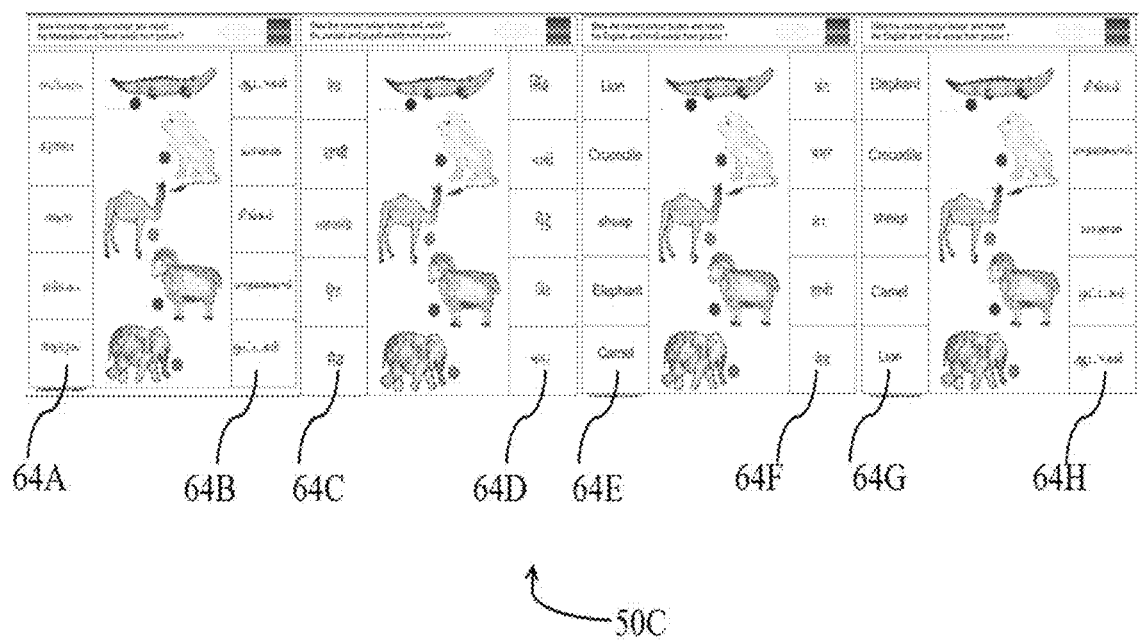

By deployment of multiple wisdom cards as per present invention simultaneously, one can learn several languages. FIGS. 12C, 12D and 12E adequately illustrate such a concept where images of same animals are given in the same order in all the wisdom cards while their names are given in different languages in different margins. FIG. 12E illustrates that as many as eight languages can be learnt simultaneously, here Malyalam (64A), Tamil (64B), Punjabi (64C), Gujarati (64D), English (64E), Hindi (64F), Mexican (64G), Urdu (64H). Such a group of wisdom cards where identical problems are given in the middle area in the same order, while the answers or solutions are in different form or language are termed as combination wisdom cards.

The learner can mount different wisdom cards in different base boards (10). Alternatively, different base boards (10) can be unified as described below.

To be able to unify, the base board (10) has a complementary joining construction on the sides of the base board (10). As shown in FIG. 16A, the base board (10) has a male part of dove tail (65) profile on a first side of the base board (10) and a female part of a dove tail profile (66) on a second side of the base board (10), such that a plurality of baseboards (10) are dove tailed and thus a number of base boards (10) can be unified, as shown in FIG. 16B.

As shown in FIG. 6 and FIG. 12, the solution code (56) is provided on every wisdom card (50), which facilitates verification of player having answered the questions correctly.

Figure 22:
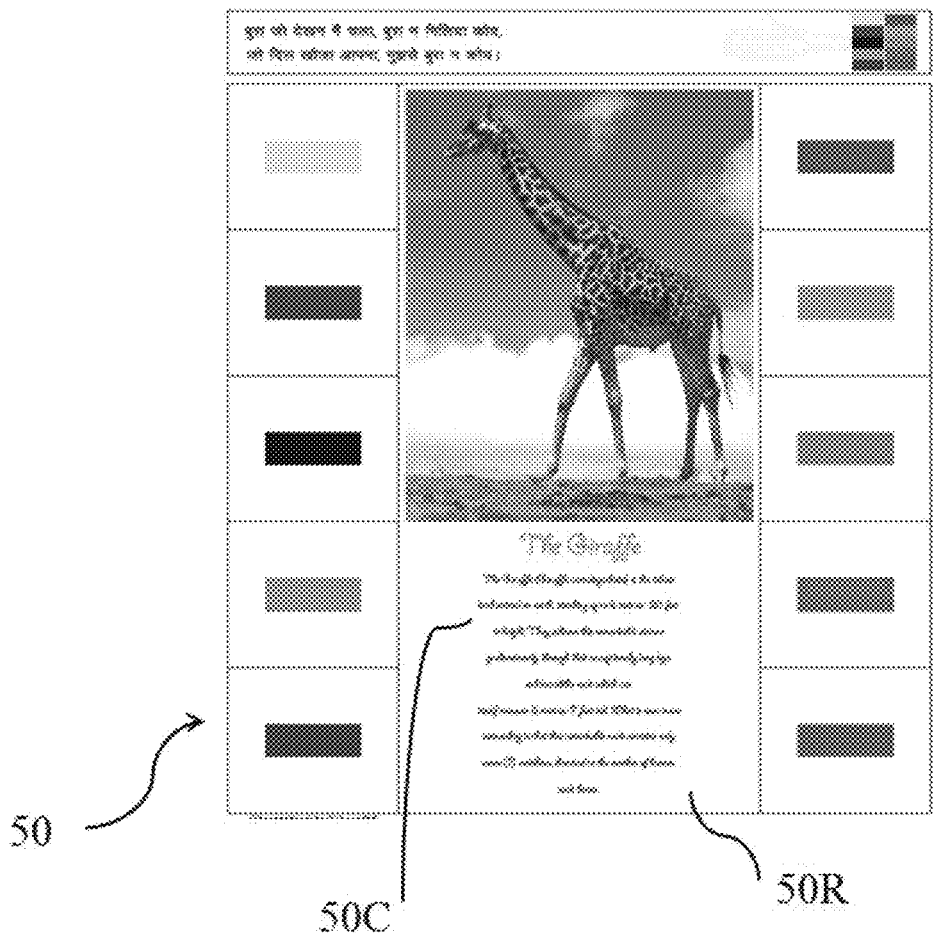
FIG. 22 shows a rear side of the wisdom card, wherein educative and or informative contents are provided in a middle of the wisdom card, and solution colours provided in the zones.

The solution code (56) is provided in the identifier section (54) of the wisdom card. Alternatively, the solution code (56) is provided on a rear side (50R) of the wisdom card (50) as shown in FIG. 22. As an alternative, the solution code (56) is provided as the respective solution colour, in the zones adjacent to the respective question or situation. As yet another alternative, the solution code (56) is provided away from the wisdom card.

On the rear side (50R) of the wisdom card, educative and or informative contents (50C) are provided as shown in FIG. 22.

As a preferred embodiment, the solution code (56) is a set of colour bars (57) which are bars of same colour as is prompted by the questions by way of an indicator near the question, and in the same order as they come on the head (34) of the sliding block (30) when all the questions are answered correctly.

Figure 10:
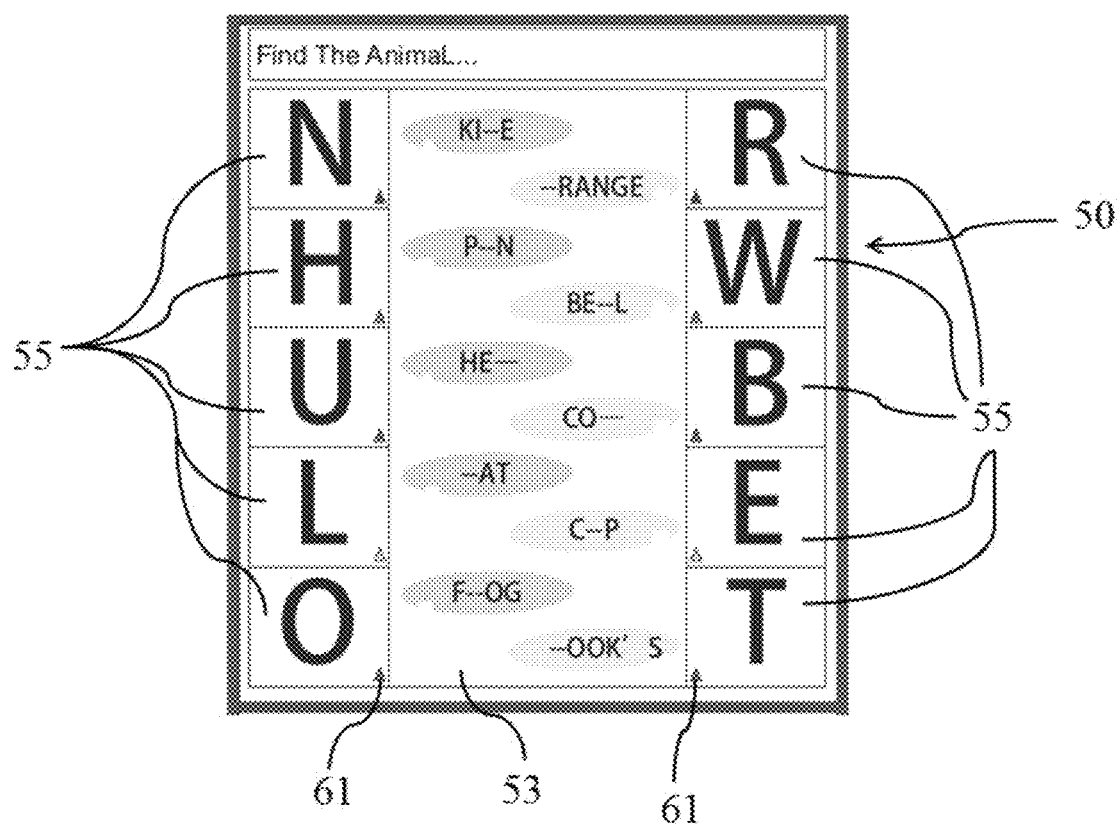
FIG. 10 shows a wisdom card wherein the indicators are placed in the zones.

As another embodiment, shown in FIG. 10, the indicator (61), which is a marker of distinct colour, is provided with answer in the plurality of zones (55); and the player is expected to place a sliding block in the solution track leading to the question, of colour prompted by the answer.

Figure 14:
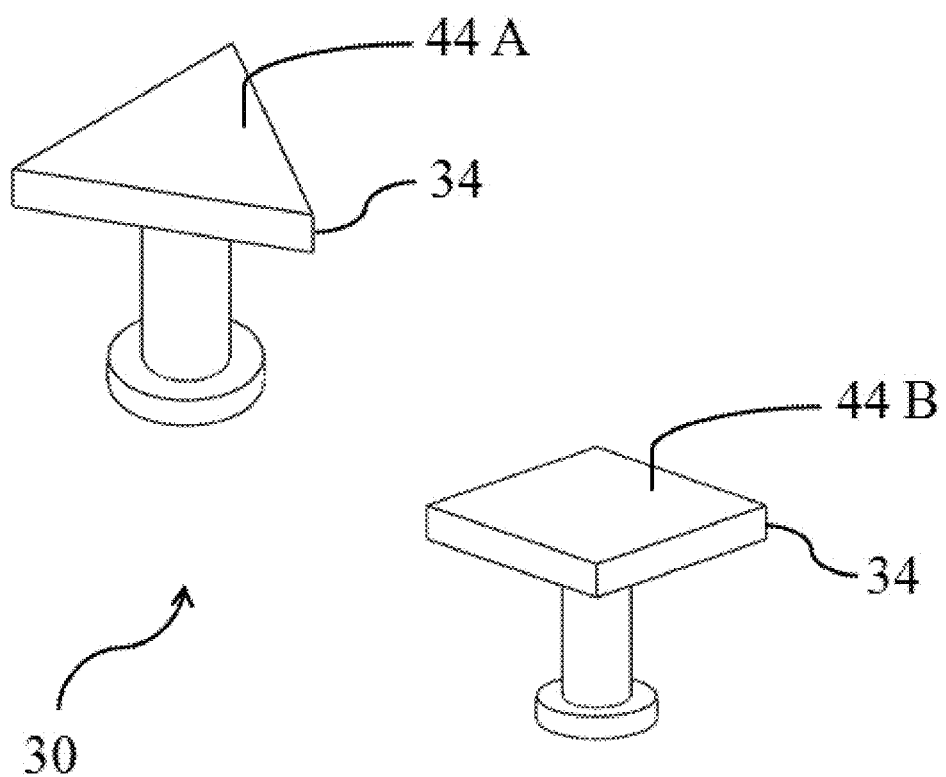
FIG. 14 shows another embodiment of sliding block where the top surface of the head is a geometric shape.
Figure 20:
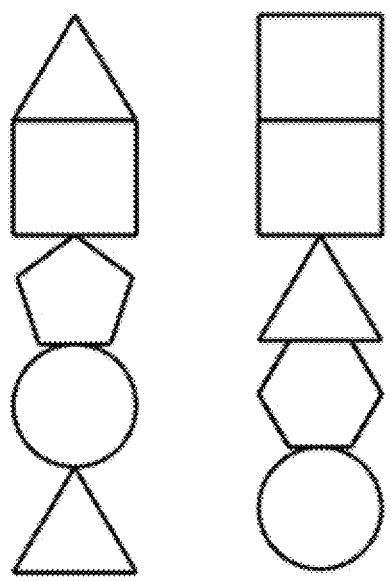
FIG. 20 shows another embodiment of solution set which is a set of geometric shapes.
Figure 20:
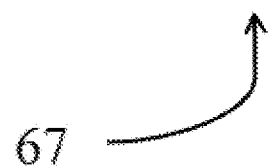

FIG. 14, as another embodiment, the distinct identification of the head (34) of the sliding block (30) is a geometric shape (44A, 44B) of the head (34). Thus, the head (34) can be a triangle or a square or a circle or a pentagon or oval, et cetera. In such an embodiment the indicator (61) in the wisdom card (50) is a geometric shape and the solution code (56) is a set of geometric shapes (67) as shown in FIG. 20.

Figure 15:
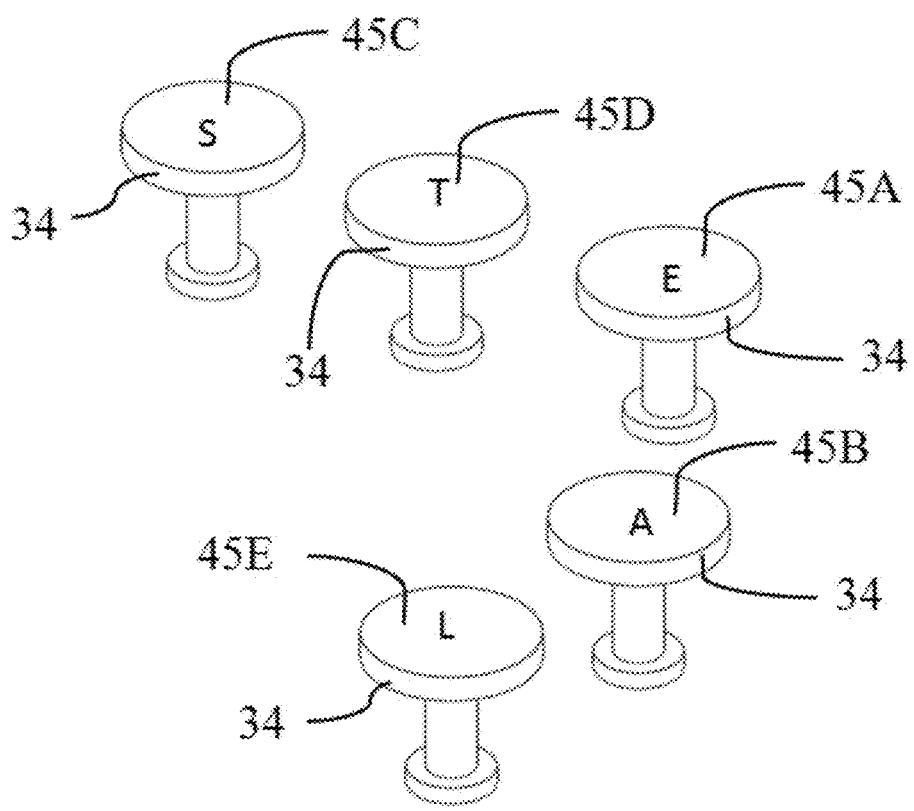
FIG. 15 shows another embodiment of sliding block where the top surface of the head has a distinct alphabet.

As another embodiment, as shown in FIG. 15, the distinct identification of the head (34) of the sliding block (30) is an alphabet (45A, 45B, 45C, 45D, 45E). In such an embodiment the indicator is an alphabet and the solution code (56) is a set of alphabets. The alphabets can be so assigned that the solution set forms a word (here STEAL). Similarly, there can be solution set of a combination of alphabets of different languages and numeric.

Figure 15A:
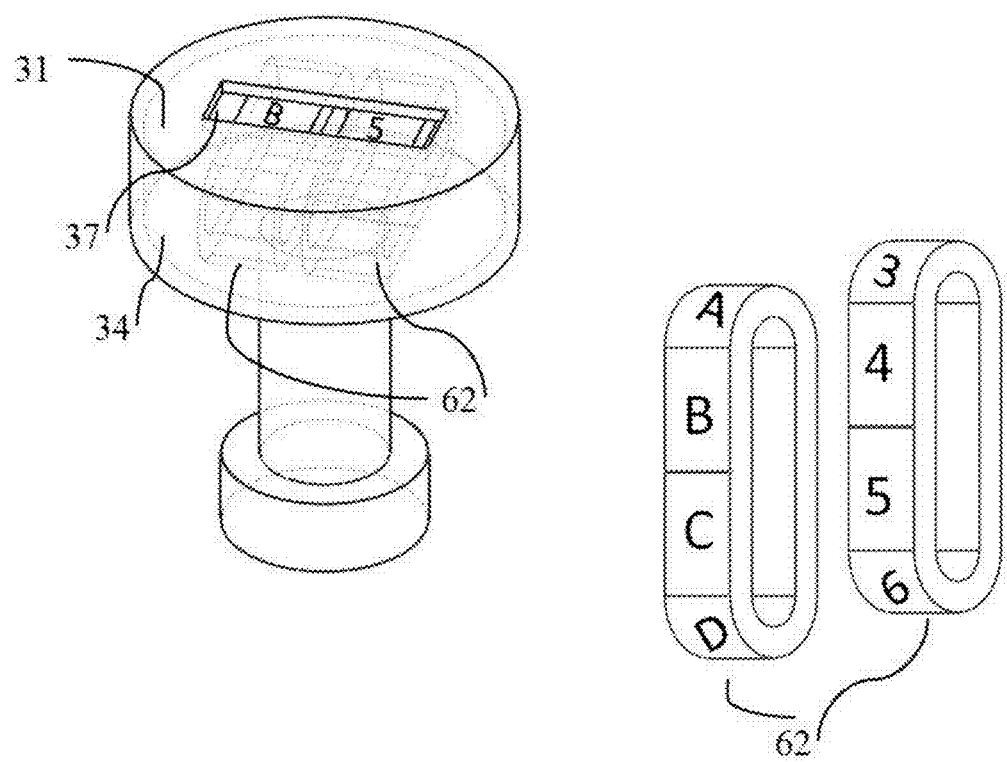
FIG. 15A shows a mechanical arrangement in a sliding block having a plurality of rolling alphabets and rolling numeric.

As another embodiment, as shown in FIG. 15A, a plurality of rolling alphabet or rolling numeric or a combination thereof is provided, by way of a plurality of flexible strips (62) containing several alphabets or numeric, embedded in the head (34) of the sliding block (30), the top surface (31) of the head (34) having a window (37), wherefrom the selected alphabet and or numeric is visible as the identifier.

Figure 13:
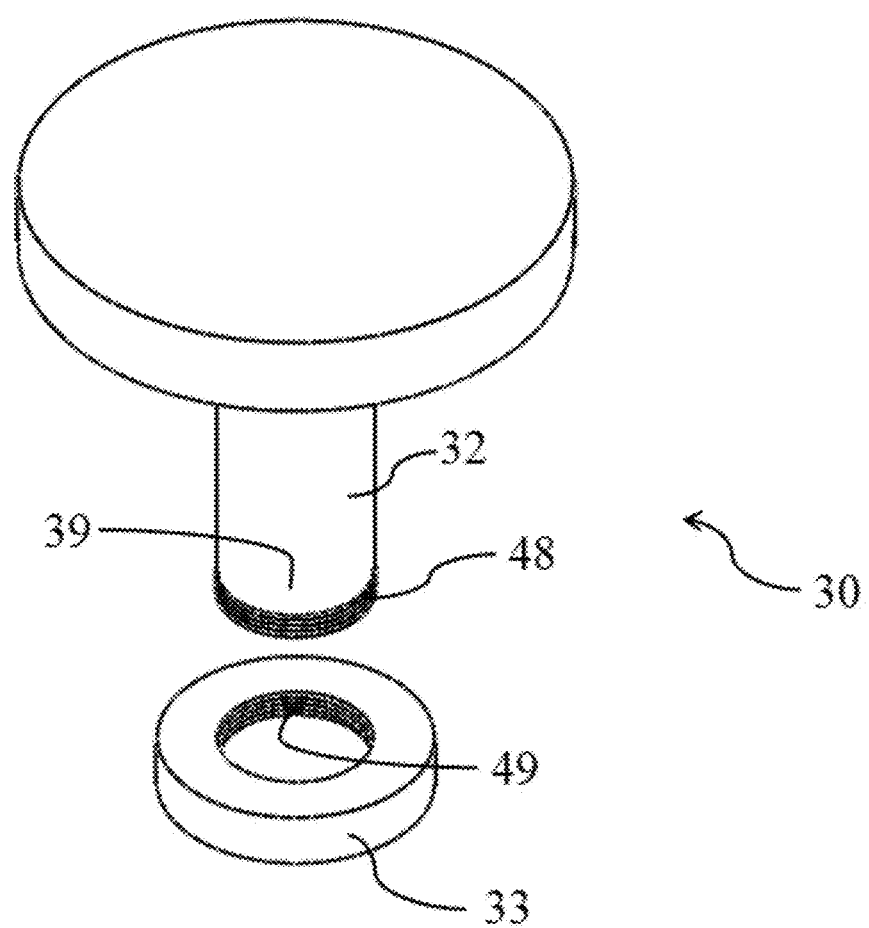
FIG. 13 shows another embodiment of sliding block with separable stopper.

As another embodiment shown in FIG. 13, to achieve the separable connection between the stopper (33) and the second end (39) of the shaft (32), the second end (39) of the shaft (32) has external threads (48) like a screw while the stopper (33) has internal threads (49) like a nut. The stopper (33) is put on the second end (39) of the shaft (32) like a nut and screw assembly.

Figure 21:
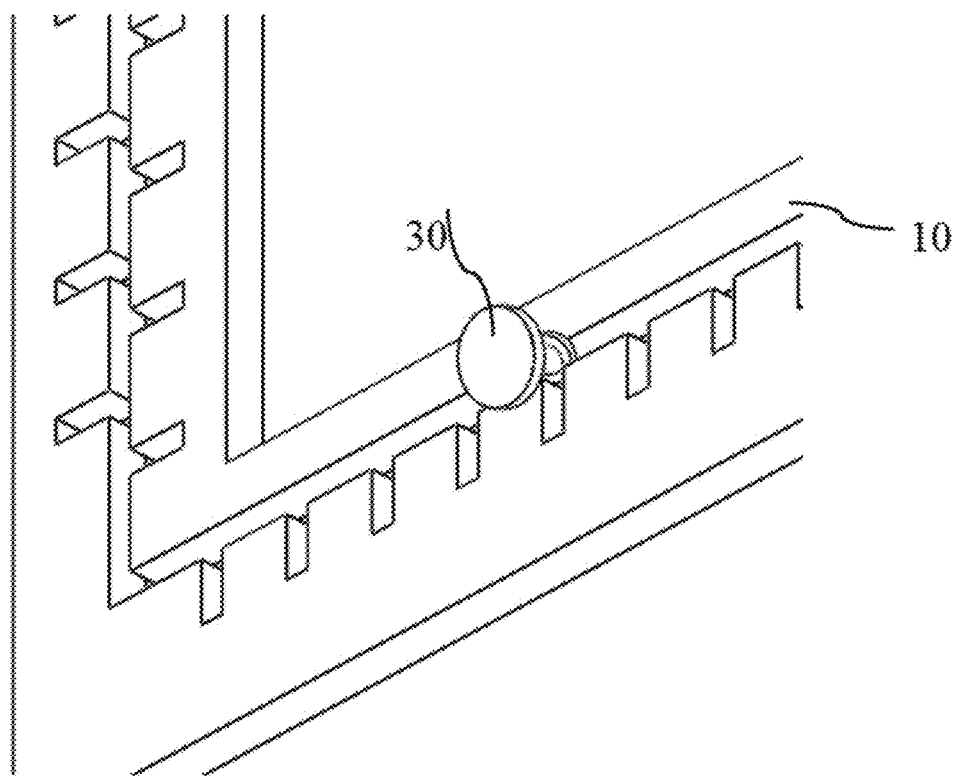
FIG. 21 shows an embodiment of sliding block having non separable stopper, being inserted through the network of tracks.

As another embodiment, the sliding block (30) is a one piece component which also means that first end (38) of the shaft (32) is non-separably connected with the head (34) and the second end (39) of the shaft (32) is also non-separably connected with the stopper (33). This is achieved, for example, by making the sliding block (30) by moulding, or casting, or by machining from a block of material. In such an embodiment, the shaft (32) and the stopper (33) are soft enough to bend slightly so as to get inserted from the network of tracks by bending slightly, as shown in FIG. 21, and then regain the shape as in FIG. 3. The sliding block (30), once mounted on the base board (10) can move freely in the network of tracks and cannot get dislodged unless the stopper (33) is maneuvered in a manner similar to insertion but this time for dislodging, using a minimum force.

Figure 16:
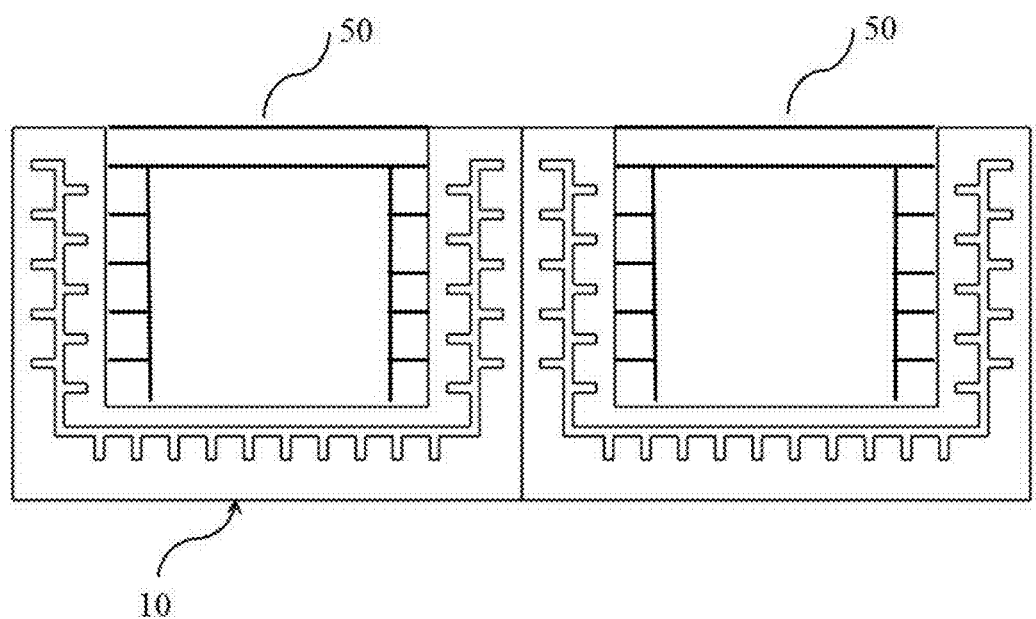
FIG. 16 shows another embodiment of base board having a plurality of open frames such that more than one wisdom card is inserted at a time.
Figure 16A:
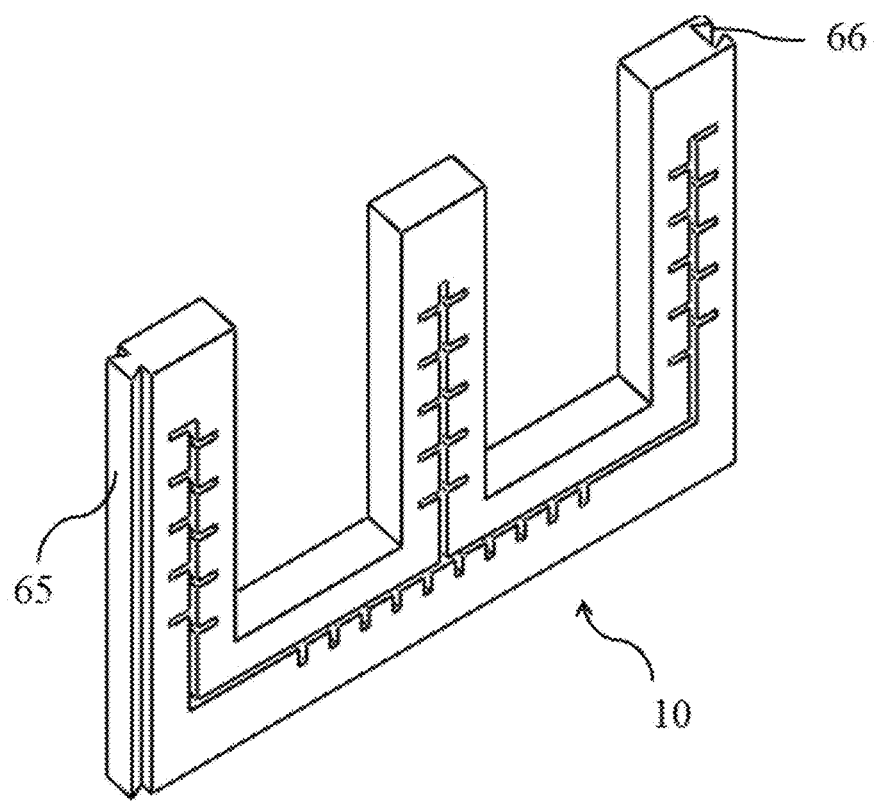
Figure 16B:
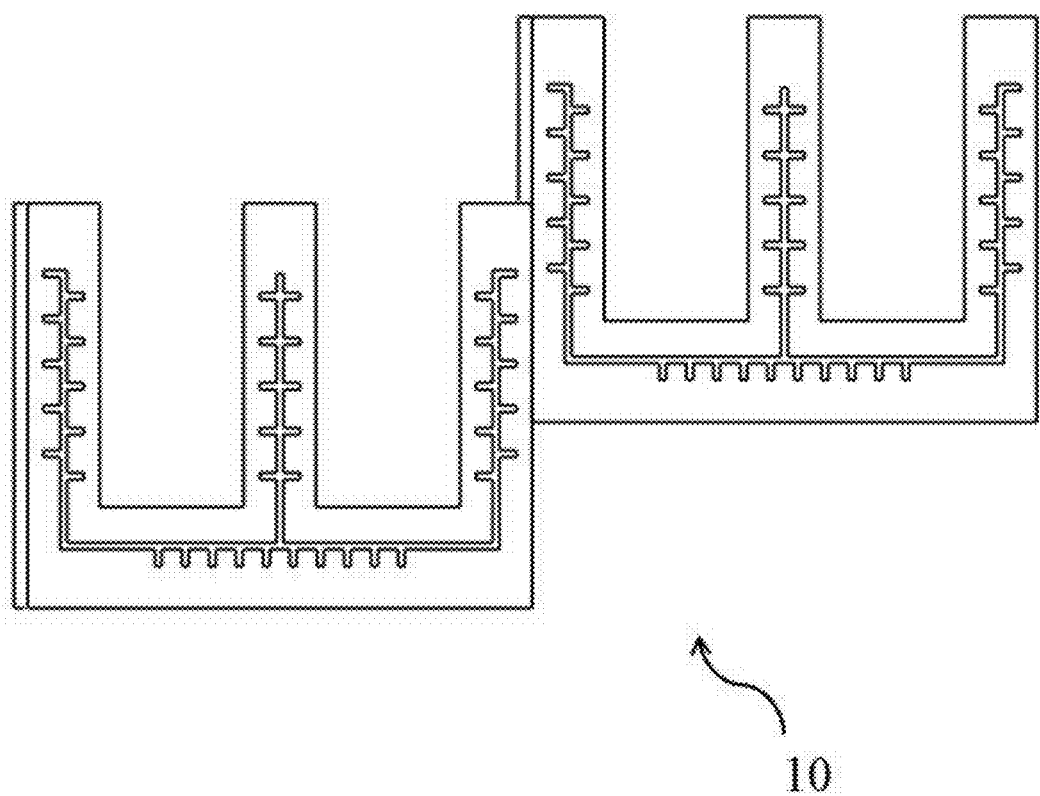
FIG. 16B shows two such base boards partially joined together for use with combination wisdom cards.

As another embodiment, the base board (10) is a plurality of open frames as shown in FIG. 16, such that more than one wisdom card (50) is inserted at a time, and where either more than one player can play or a single player can play on multiple wisdom cards.

Figure 17:
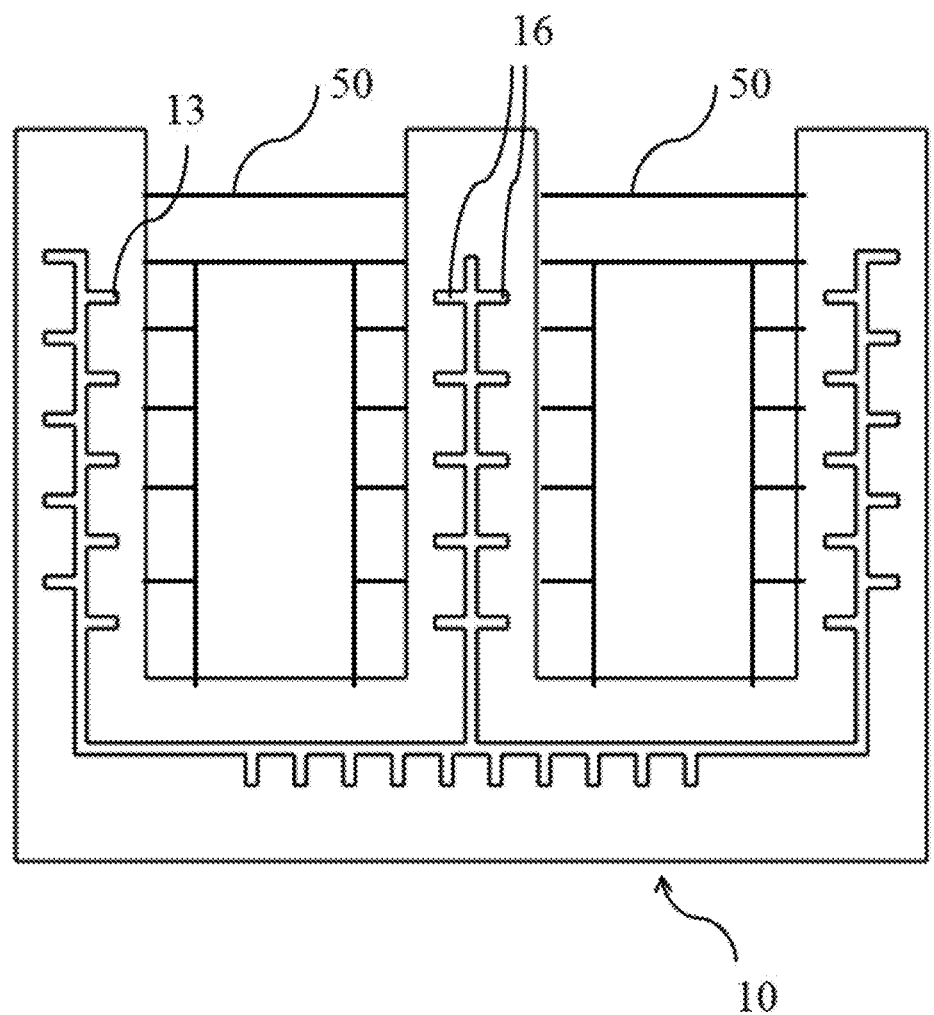
FIG. 17 shows another embodiment of the base board where more than one wisdom card is inserted and some of the tracks can function as parking tracks as well as solution tracks.

As another embodiment, where there is more than one wisdom card (50) insertable, some of the tracks (16) can function as parking track as well as solution tracks as shown in FIG. 17.

Figure 17A:
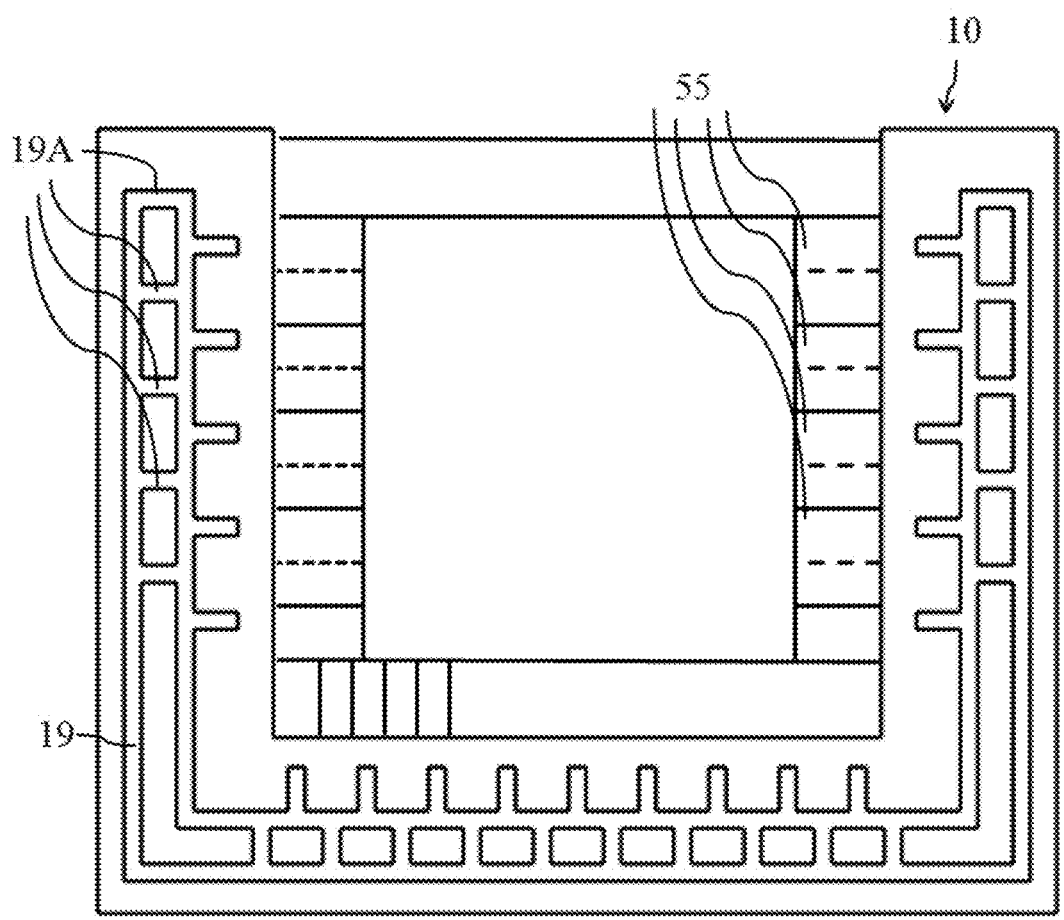
FIG. 17A shows another embodiment of the base board with a continuous parking track and a plurality of alternately reverse ending tracks.

FIG. 17A, as another embodiment of the base board, the base board (10) has a continuous parking track (19) and a plurality of alternately reverse ending tracks (19A) usable as solution tracks (13). Correspondingly, by creating more zones (55) on the wisdom card, demonstrated by dotted lines, more number of questions is incorporable in the middle area of the wisdom card (50).

Figure 18:
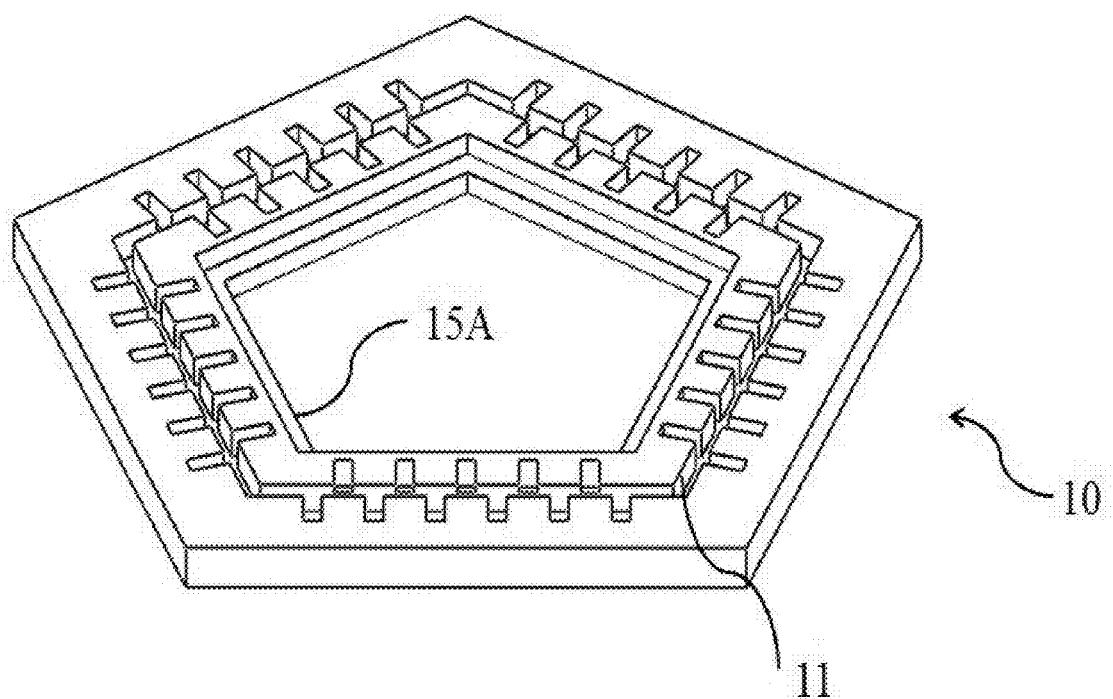
FIG. 18 shows yet another embodiment of the base board with a closed frame and a network of tracks, with an open recess of the base board.
Figure 19:
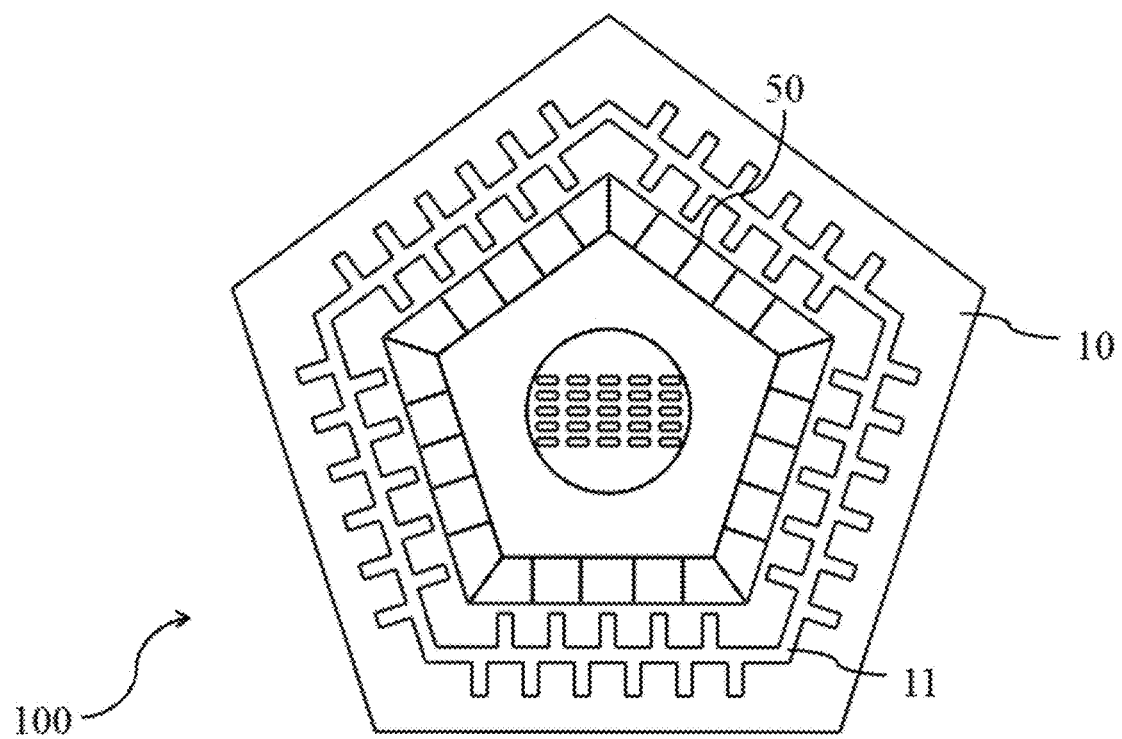
FIG. 19 shows yet another embodiment of the learning device having a base board with a closed frame and a corresponding layout of a wisdom card.

As another embodiment, the base board (10) is a close frame as shown in FIG. 18 with five sides. FIG. 19 shows, correspondingly, the modular learning device (100) with the wisdom card (50) mounted on an open recess (15A), the spinal track (11) all around.

There are several ways in which the intelligent device as disclosed in present invention can be constructed. The network of tracks disclosed here is a continuous track, however the network of tracks can be discrete and comprising of several holes or holding places or locating places.

The sliding block (30) is described as mounted in the disclosure but the sliding block can be in the form of a solution coin, merely placed instead of sliding or moving.

The sliding block as described or in the form of the solution coin can have a magnet in order to attach to the base board.

The invention claimed is:

1. A modular learning device comprising of:
a base board having a frame with plurality of sides, a complementary joining construction on sides of the base board, a front plane, a rear plane, a network of tracks having a spinal track, several dormant tracks, several solution tracks, several parking tracks, the dormant tracks and the parking tracks and the solution tracks are connected to the spinal track, a recess, wherein some parking tracks are also solution tracks;
a plurality of sliding blocks having a tread, a stopper and a shaft, the shaft having a first end and a second end; and
a plurality of wisdom cards having an identifier section, a margin having up to same number of sides as the base board, a plurality of zones in the margin, a middle area and corresponding solutions in the zones randomly, a solution code for problems or situations, each wisdom card containing different problems or situations on a plurality of subjects, an indicator for each problem or situation, wherein the indicator is a hint or a prompt to arrive at correct provided solution;
different base boards unifiable by the complementary joining construction on the sides of the base board, the plurality of wisdom cards mounted, either one at a time, or in combination, one in each recess of the base board, the plurality of sliding blocks mounted on the base board with the head on the front plane of the base board and the stopper on the rear plane of the base board, the plurality of sliding blocks can move freely in the network of tracks and cannot get dislodged unless the stopper is separated or manoeuvred using a minimum force.

2. The modular learning device as claimed in claim 1, wherein the frame of the base board is a plurality of open frames.

3. The modular learning device as claimed in claim 1, wherein the frame of the base board is a plurality of closed frames.

4. The modular learning device as claimed in claim 1, wherein the recess is an open recess.

5. The modular learning device as claimed in claim 1, wherein the recess is an enclosed recess.

6. The modular learning device as claimed in claim 1, wherein the complementary joining construction on sides of the base board is a male part of dove tail profile on a first side of the base board and a female part of a dove tail profile on a second side of the base board, such that a plurality of baseboards are dove tailed.

7. The modular learning device as claimed in claim 1, wherein the base board has a continuous parking track and a plurality of alternately reverse ending tracks usable as solution tracks.

8. The modular learning device as claimed in claim 1, wherein the head of the sliding block is a rigid platform.

9. The modular learning device as claimed in claim 1, wherein the head of the sliding block has a top surface having a distinct identification.

10. The modular learning device as claimed in claim 9, wherein the distinct identification is a distinct colour.

11. The modular learning device as claimed in claim 9, wherein the distinct identification is a distinct geometric shape.

12. The modular learning device as claimed in claim 9, wherein the distinct identification is a distinct alphabet or a distinct numeric.

13. The modular learning device as claimed in claim 9, wherein the distinct identification is a plurality of rolling alphabets or a plurality of rolling numeric or a plurality of alphanumeric combination.

14. The modular learning device as claimed in claim 1, wherein the spinal track has a width which is same as a width of the parking track and which is same as a width of the dormant track and which is same as a width of the solution track, and the spinal track has the width slightly more than a diameter of the shaft of the sliding block.

15. The modular learning device as claimed in claim 1, wherein the base board has a thickness marginally more than a length of the shaft.

16. The modular learning device as claimed in claim 1, wherein the second end of the shaft is separably connected with the stopper.

17. The modular learning device as claimed in claim 1, wherein the second end of the shaft has a projection, the stopper has a blind hole in an internal groove therein; the integral groove of the stopper accommodates the projection in the internal groove on pushing in the second end of the shaft in the blind hole of the stopper.

18. The modular learning device as claimed in claim 1, wherein the second end of the shaft has external threads like a screw, the stopper has internal threads like a nut; the stopper is put on the second end of the shaft like a nut and a screw assembly.

19. The modular learning device as claimed in claim 1, wherein the second end of the shaft is non separably connected with the stopper.

20. The modular learning device as claimed in claim 1, wherein the shaft and the stopper are inserted from the network of tracks by bending slightly, and then the shaft and the stopper regain the shape.

21. The modular learning device as claimed in claim 1, wherein the sliding block has a magnet.

22. The modular learning device as claimed in claim 1, wherein the plurality of zones of the wisdom card have a solution track of the base board opposite each zone.

23. The modular learning device as claimed in claim 1, wherein the solution code is a set of colour bars.

24. The modular learning device as claimed in claim 1, wherein the solution code is a set of geometric figures.

25. The modular learning device as claimed in claim 1, wherein the solution code is a set of alphabets or numeric.

26. The modular learning device as claimed in claim 1, wherein the solution code is a dictionary word.

27. The modular learning device as claimed in claim 1, wherein the solution code is in the form of respective zones having the indicator.

28. The modular learning device as claimed in claim 1, wherein the solution code is on a backside of the wisdom card.

29. The modular learning device as claimed in claim 1, wherein the indicator is provided with each question near corresponding zone.

30. The modular learning device as claimed in claim 1, wherein the indicator is provided with each solution in corresponding zone.

31. The modular learning device as claimed in claim 1, wherein the indicator is a marker of a distinct colour.

32. The modular learning device as claimed in claim 1, wherein the indicator is a distinct geometric shape.

33. The modular learning device as claimed in claim 1, wherein the indicator is an alphabet or a numeric.

34. The modular learning device as claimed in claim 1, wherein the learning device, when ready to be deployed, has sliding blocks positioned in the dormant tracks and a selected wisdom card mounted in the recess of the base board.

35. The modular learning device as claimed in claim 1, wherein the sliding bock is moved from the dormant track to the solution track that has the solution at the end of corresponding solution track.

36. The modular learning device as claimed in claim 1, wherein the sliding block is moved from the dormant track to the solution track that has the problem or situation at the end of solution track.

37. The modular learning device as claimed in claim 1, wherein the identifier section of the wisdom card contains subject of the wisdom card, educative or inspirational sentence or verse in a language understood by the person using the device.

38. The modular learning device as claimed in claim 1, wherein the plurality of subjects is on academics, language, behaviour, sports, education, for persons with specific biological constraints, for cross learning of two or more subjects, for learning several languages together.

39. The modular learning device as claimed in claim 1, wherein the wisdom card has educative and or informative contents provided on a rear side.

40. The modular learning device as claimed in claim 1, wherein the plurality of subjects are in the wisdom card.

41. The modular learning device as claimed in claim 1, wherein the plurality of subjects are in a combination wisdom cards.

* * * * *